Oct. 14, 1952     L. YUTANG     2,613,795
CHINESE TYPEWRITER

Filed April 17, 1946     17 Sheets-Sheet 2

INVENTOR.
LIN YUTANG
BY
Campbell, Brumbaugh + Free
his ATTORNEYS

Oct. 14, 1952        L. YUTANG        2,613,795
CHINESE TYPEWRITER

Filed April 17, 1946        17 Sheets-Sheet 3

Inventor
LIN YUTANG

By Campbell, Brumbaugh & Free
his Attorney

Oct. 14, 1952   L. YUTANG   2,613,795
CHINESE TYPEWRITER
Filed April 17, 1946   17 Sheets-Sheet 4

Inventor
LIN YUTANG
By Campbell, Brumbaugh & Free
his Attorney

Oct. 14, 1952 — L. YUTANG — 2,613,795
CHINESE TYPEWRITER
Filed April 17, 1946 — 17 Sheets-Sheet 5
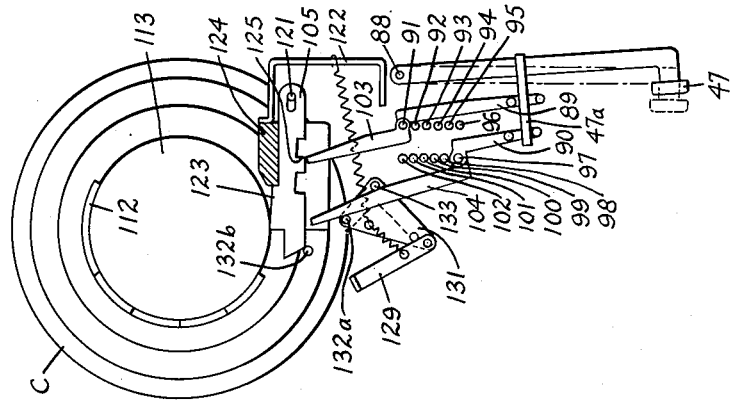
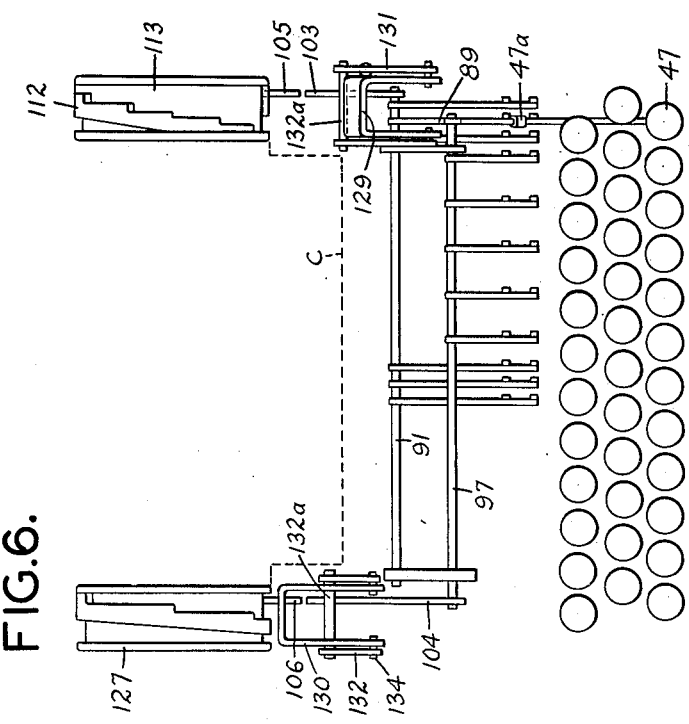
INVENTOR.
LIN YUTANG
BY
*Campbell, Brumbaugh & Free*
HIS ATTORNEYS.

Oct. 14, 1952 L. YUTANG 2,613,795
CHINESE TYPEWRITER
Filed April 17, 1946 17 Sheets-Sheet 6

Inventor
LIN YUTANG

By Campbell, Brumbaugh + Free
his Attorney

Oct. 14, 1952 L. YUTANG 2,613,795
CHINESE TYPEWRITER
Filed April 17, 1946 17 Sheets-Sheet 7

Inventor
LIN YUTANG
By Campbell, Brumbaugh + Free
his Attorney

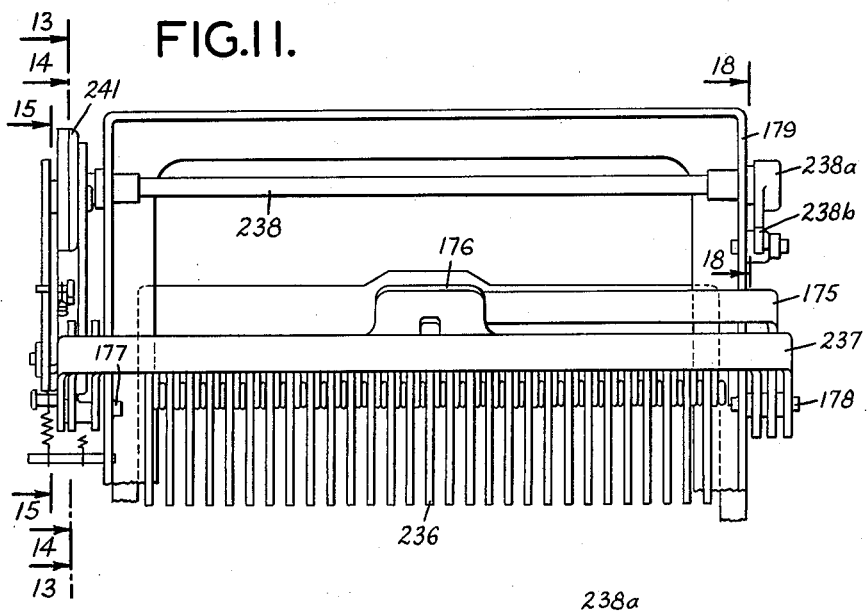
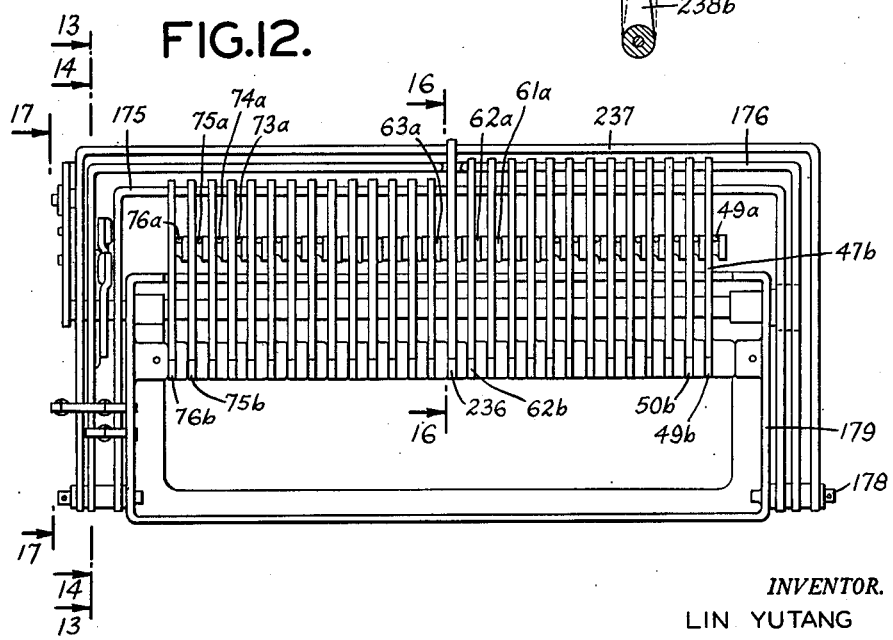

Oct. 14, 1952 — L. YUTANG — 2,613,795
CHINESE TYPEWRITER
Filed April 17, 1946 — 17 Sheets-Sheet 9

INVENTOR.
LIN YUTANG
BY Campbell, Brumbaugh & Free
HIS ATTORNEYS.

Oct. 14, 1952 L. YUTANG 2,613,795
CHINESE TYPEWRITER
Filed April 17, 1946 17 Sheets-Sheet 10
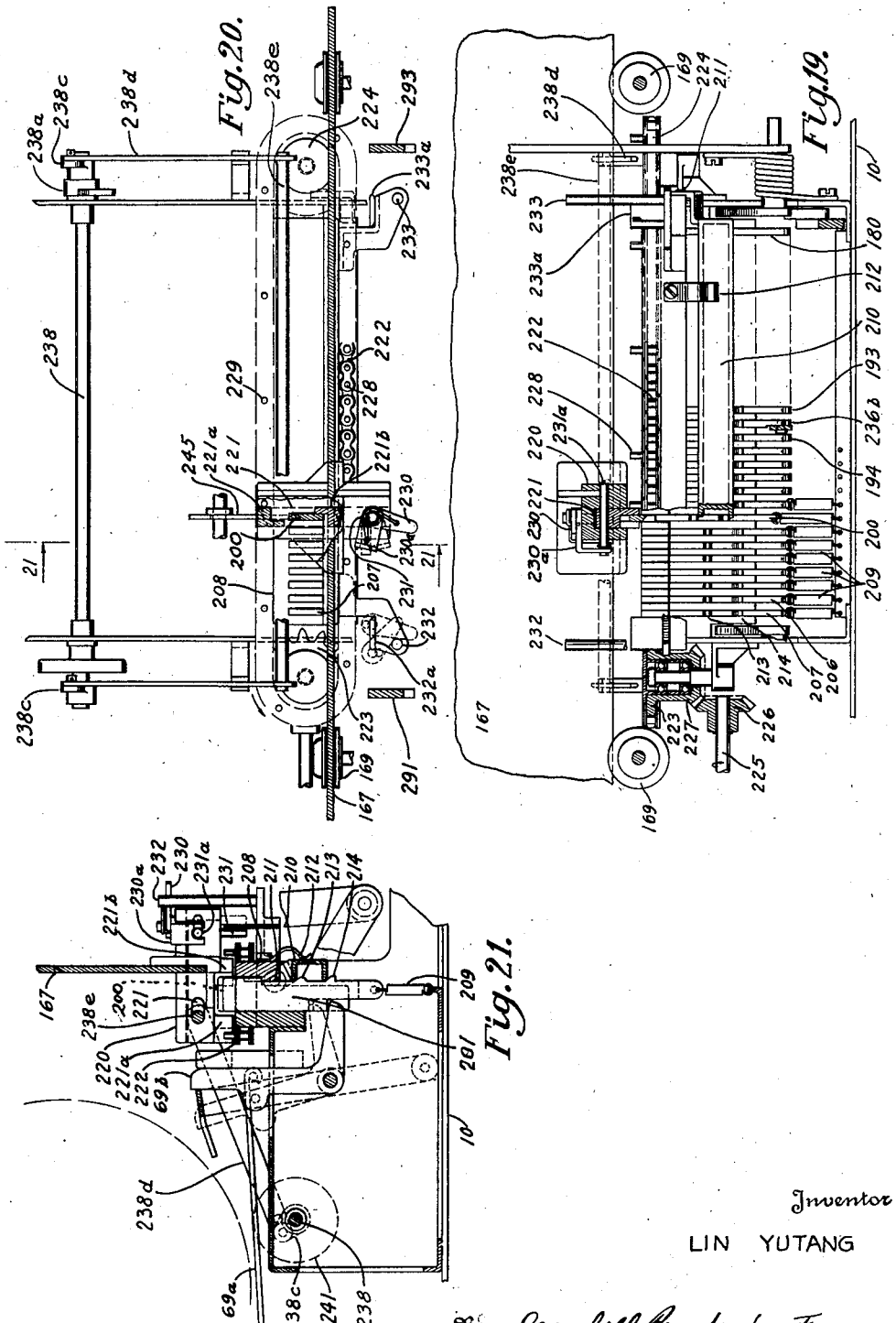
Inventor
LIN YUTANG
By Campbell, Brumbaugh & Free
his Attorney Oct. 14, 1952  L. YUTANG  2,613,795
CHINESE TYPEWRITER
Filed April 17, 1946  17 Sheets-Sheet 11
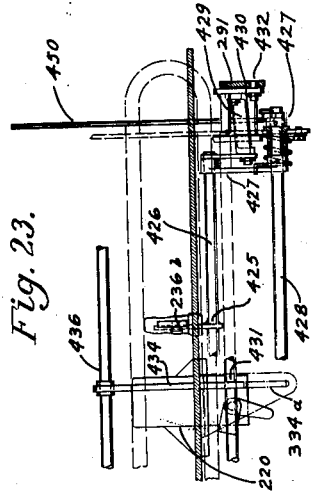
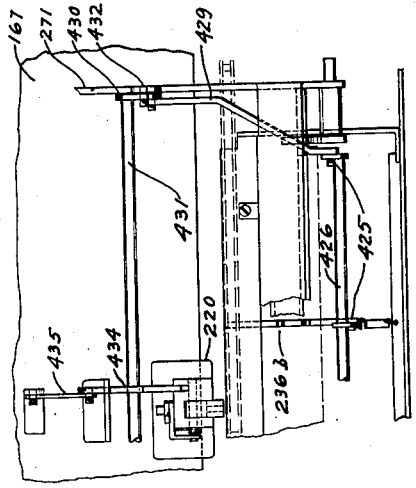
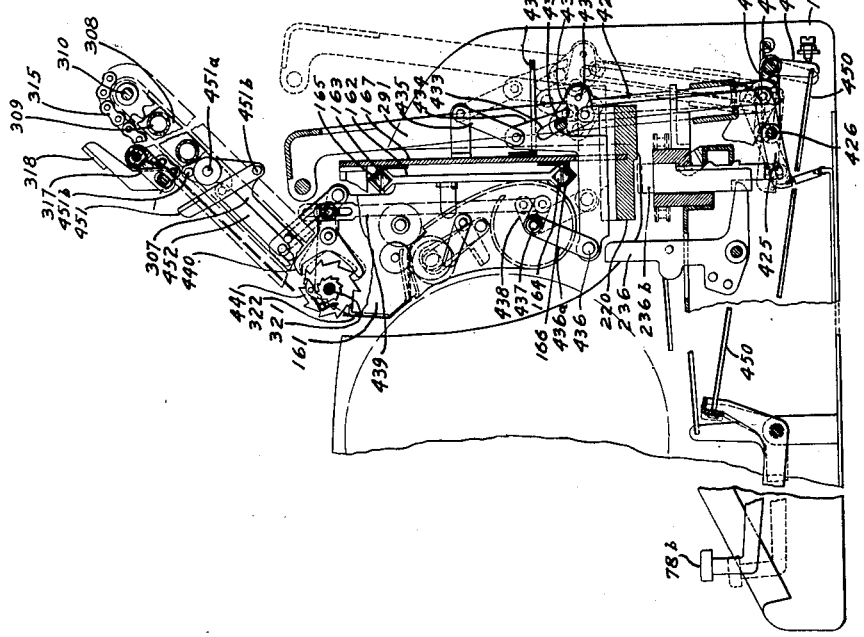
Inventor
LIN YUTANG
By Campbell, Brumbaugh + Free
his Attorney Oct. 14, 1952  L. YUTANG  2,613,795
CHINESE TYPEWRITER
Filed April 17, 1946  17 Sheets-Sheet 12
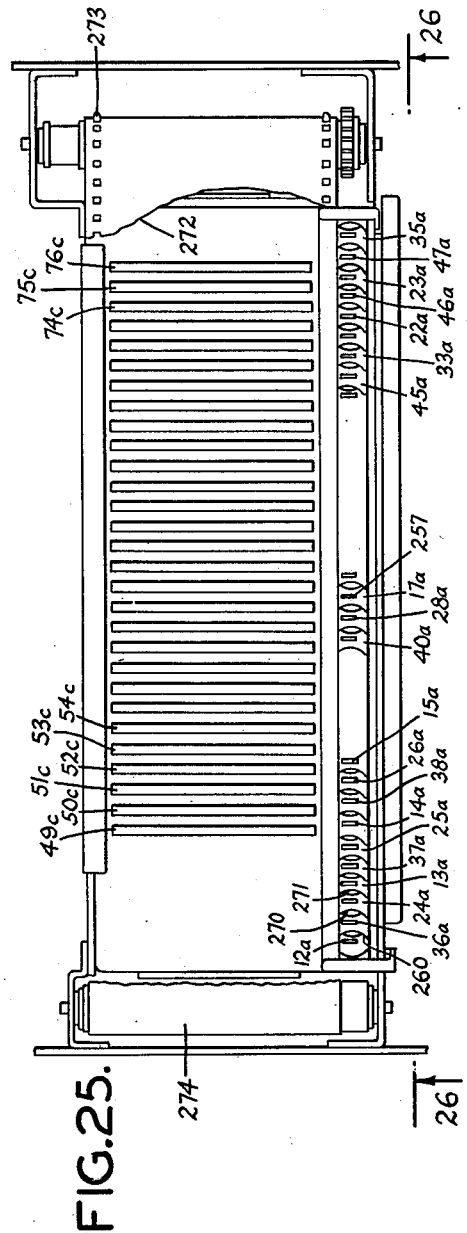
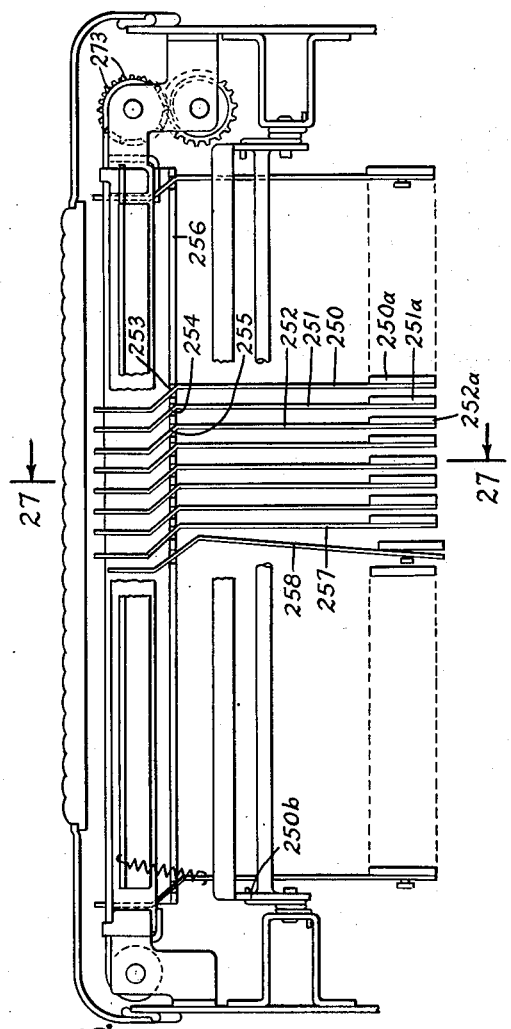
INVENTOR.
LIN YUTANG
BY
Campbell, Brumbaugh + Free
HIS ATTORNEYS.

Oct. 14, 1952        L. YUTANG        2,613,795
CHINESE TYPEWRITER
Filed April 17, 1946        17 Sheets-Sheet 13
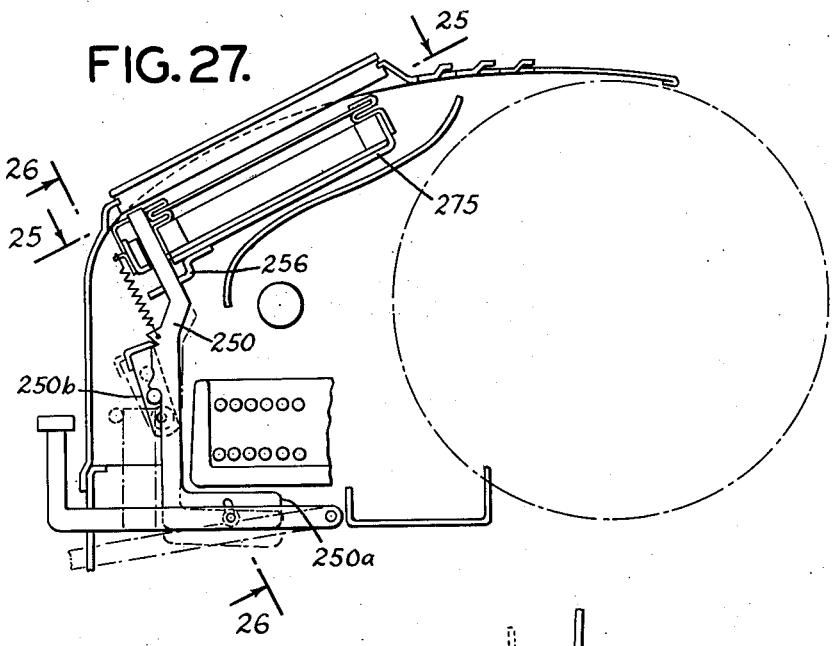
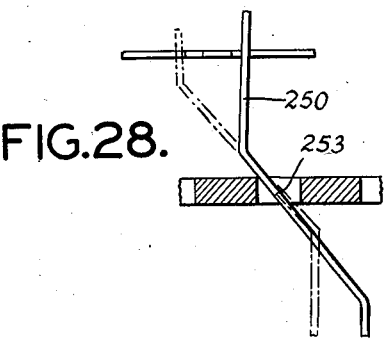
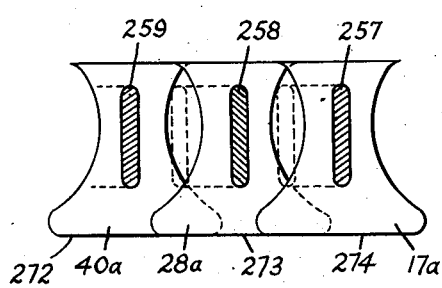
INVENTOR.
LIN YUTANG
BY
HIS ATTORNEYS.

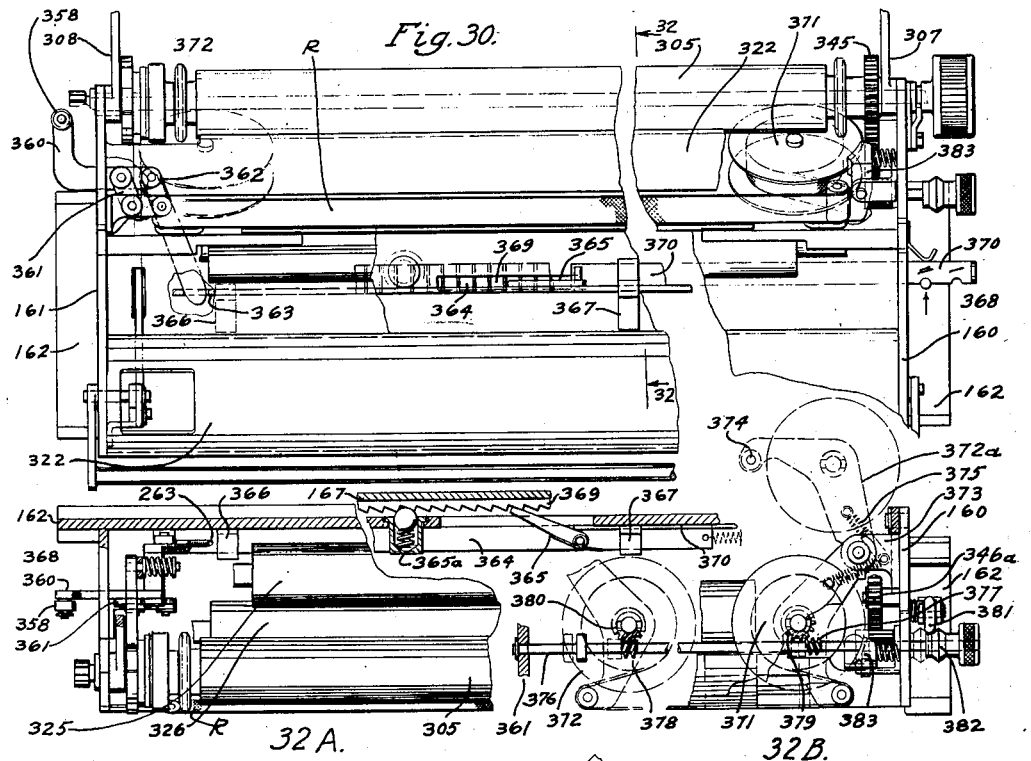

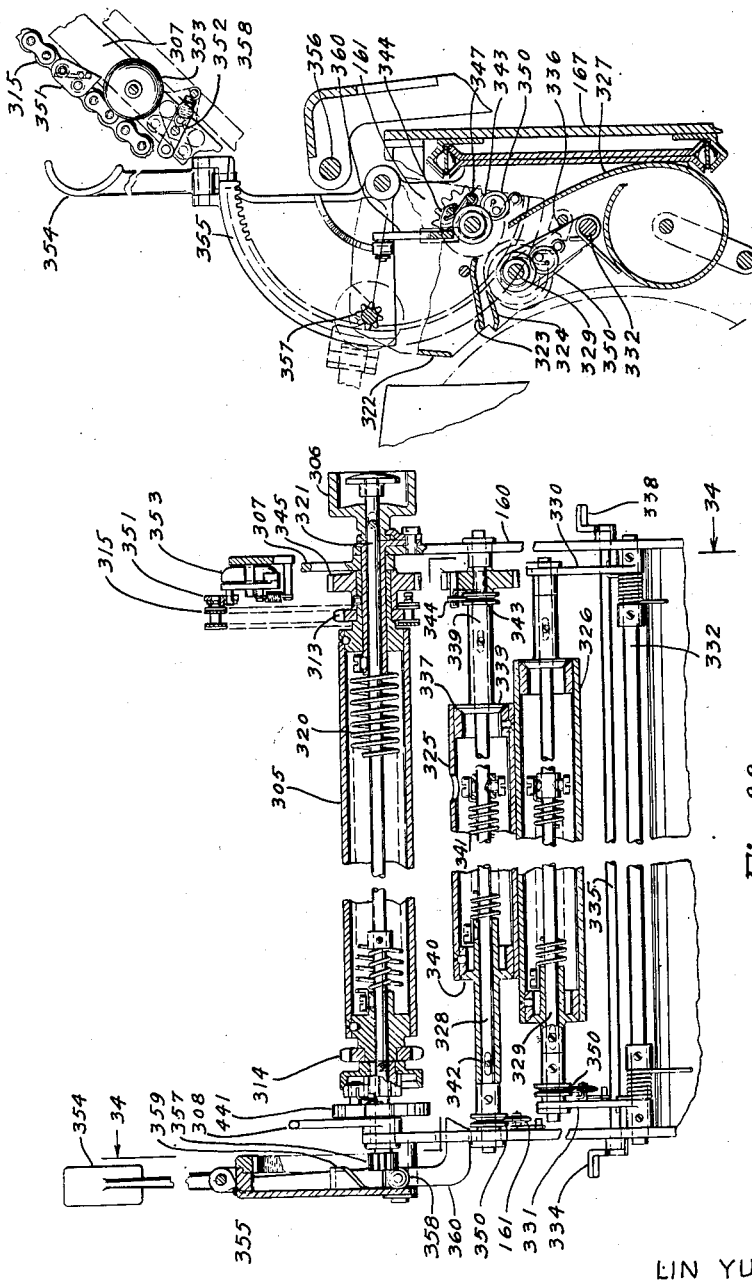

Oct. 14, 1952  L. YUTANG  2,613,795
CHINESE TYPEWRITER
Filed April 17, 1946  17 Sheets-Sheet 16
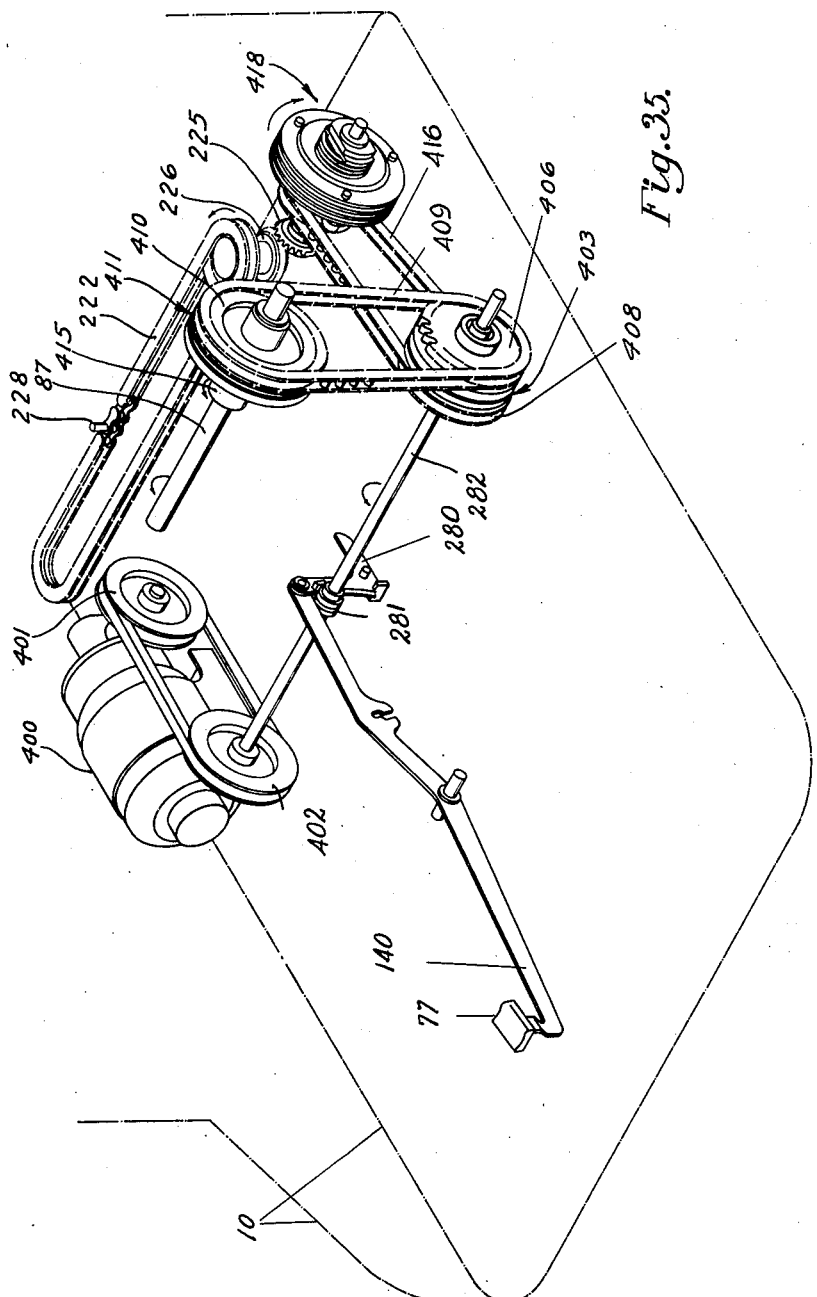
Inventor
LIN YUTANG
By Campbell, Brumbaugh & Free
his Attorney Oct. 14, 1952     L. YUTANG     2,613,795
CHINESE TYPEWRITER
Filed April 17, 1946     17 Sheets-Sheet 17
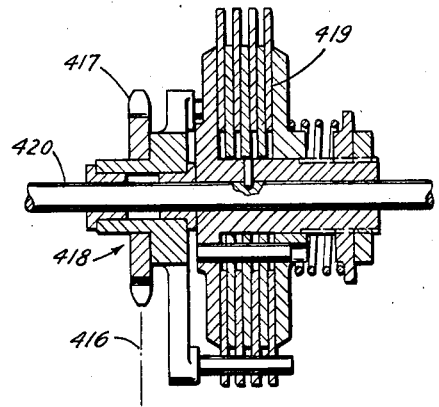
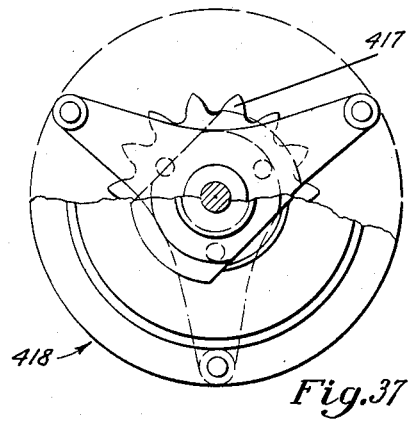
Fig.37
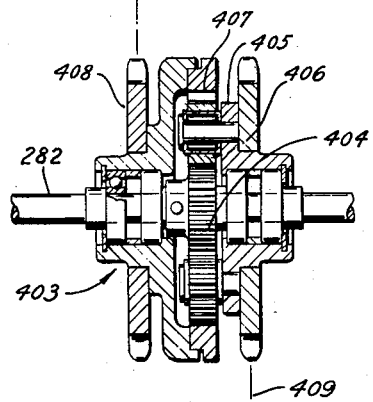
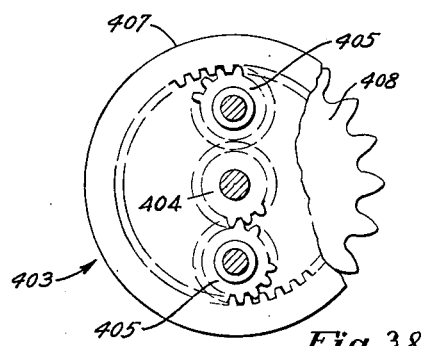
Fig.38.
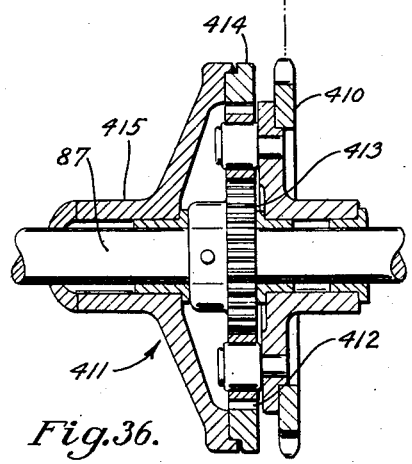
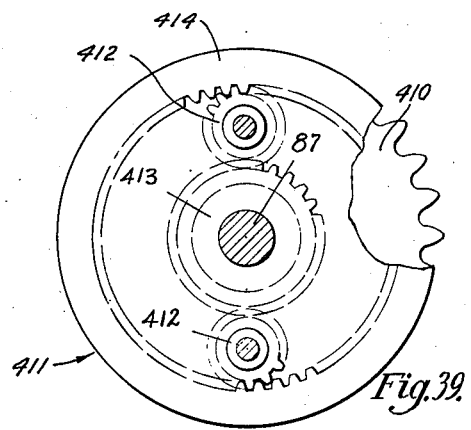
Fig.36.     Fig.39.
Inventor
LIN YUTANG
By Campbell, Brumbaugh & Free
his Attorney Patented Oct. 14, 1952

2,613,795

UNITED STATES PATENT OFFICE 2,613,795

CHINESE TYPEWRITER

Lin Yutang, New York, N. Y., assignor to Mergenthaler Linotype Company, Brooklyn, N. Y., a corporation of New York Application April 17, 1946, Serial No. 662,722

68 Claims. (Cl. 197—1)

This invention relates to methods of classifying the characters of the Chinese and other Oriental or the like languages utilizing symbols for written communications, and to devices for forming, selecting, and/or printing or otherwise manifesting such foreign characters. The invention relates more particularly to devices for printing Chinese characters such as typewriters, Linotypes, Teletypes, typesetting devices and the like.

The symbols or characters used in writing the Chinese language consist of one or more components. Most of these characters consist of a left hand component forming a classifying symbol and a right hand component forming the phonetic of the word. In some of the characters, however, the classifying component is not at the left hand side of the character and the phonetic component is not in the right hand position. Also, many of the components may be used alone. Inasmuch as the components are not always in the same positions in the characters, a simple and logical classification of the characters has never been devised heretofore.

The K'ang-Hsi dictionary lists about 43,000 Chinese characters. The arrangement of these characters in the dictionary in a great many instances is arbitrary and, as a result, a great deal of skill is required to use the dictionary and find the desired character and its meaning in the dictionary.

The modern dictionaries such as those used in high schools and colleges contain between 10,000 and 15,000 Chinese characters. The classification or indexing of the characters still follows the K'ang-Hsi system.

The Chinese telegraph code book which contains a sufficient number of words that may be needed in everyday correspondence contains about 9,000 Chinese characters.

The great number of characters required for correspondence or adequate written transmission of the Chinese language has made it impossible heretofore to provide practical devices, such as typewriters, Linotypes, typesetting, printing telegraph and the like devices for printing or transmitting correspondence or news in the Chinese language.

The principal reason for the failure of the prior types of Chinese typewriters and similar devices is the impossibility of providing enough types to print all of the characters required for modern Chinese and at the same time of providing a simple, quick and sure means for selecting the desired character or component from so many thousands of types.

It has been proposed heretofore to use a drum having about 4,000 to 5,000 characters thereon and to arrange the drum so that any of these characters or components thereof can be brought into a desired printing position. However, no keyboard has been provided whereby a desired character or component can be selected quickly. In order to use the device, it is necessary to memorize the positions of the characters on the drum. Even exceptional individuals can only remember the positions of two or three thousand of the characters or their components, a number that is insufficient to permit the printing of coherent messages, news or other information, as indicated by the fact that at least 9,000 characters are provided for sending telegraphic messages.

Since no simple and self-evident index keyboard has been invented and applied to the prior devices, they cannot compete in speed with ordinary Chinese writing. Therefore, up to the present time, it has been necessary to prepare and transmit messages in writing rather than by mechanical means. In the case of Chinese newspapers and books, it is necessary to set type manually from the many thousands of type characters from stacks occupying a whole room floor.

It occurred to me that a more definite and concise classification of the characters making up the Chinese language would be required before a satisfactory typewriter or other printing or character-forming device could be produced. After many years of study, I have devised a classification system which reduces the written Chinese language to its fundamentals and permits the classification of the written symbols in a simple and accurate manner and which, in turn, permits typewriters and other type-forming or printing devices to be operated with little training and with a relatively small keyboard.

I have discovered that all Chinese characters or their components can be classified into smaller groups by referring to the configuration of the strokes at the top of the character and the configuration of the strokes at the bottom of the character. By selecting the characters by their top and bottom configurations, the characters or their components can be divided into relatively small groups from which the desired character can be selected. Furthermore, in order to answer the need for providing all characters needed in modern communications, I have found that the greater part of the characters making up the written Chinese language can be formed from about 70 to 80 left hand components, each forming a classifier, and about 1,300 right hand components, each forming a phonetic. The left hand and right hand components can be combined to print, select or form about 90,000 Chinese characters, some of which actually do not exist, for the same reason that it is possible to spell words in the English language that do not exist.

The components referred to above do not permit the entire Chinese language to be printed, however, for the reason that some characters have the phonetics in the left hand position, while the classifiers are in the right hand position, and others have components in top and bottom relations, and still others are integral units. There is no advantage in breaking these down into components, and they may be used as complete characters in my systems. It is my discovery that the development of a method to print by components, characters which have a classifier at the left and to print all other characters whole, is the only practicable way to reduce the number of types to be provided in a typewriter.

In addition to the discovery of the arrangement of the components of the characters, I have devised a system for selecting either complete characters of the type described above or the components of the characters by reference to the shape or design of the strokes making up the character at the top and the bottom of the character. Thus, for example, when it is desired to print a complete character, such as a simple or integral symbol or one which has the phonetic in the left hand position and the classifier in the right hand position, selection of all the characters having the same top and bottom configurations will reduce the number of characters from which a selection must be made to the average of four or five, thereby facilitating the final selection of the desired character. When a composite character is to be printed, the classifier in the left hand position can be selected by reference to the top configuration of the classifier. When a component is to be selected from the 1,300 right hand components or phonetics, reference may be had to the top and bottom configuration of these components in order to select a relatively small number of right hand components having these configurations from which the desired component can be selected visually.

Composite characters in common use can be indexed and typed like integral characters when types for such whole composite characters are provided.

This arbitrary classification according to the top and bottom configuration of characters and components thereof permits a keyboard to be provided which has a relatively small number of keys in proportion to the number of components or characters that can be printed. Thus, for example, in the typewriter described hereinafter, the keyboard may be provided with thirty-six keys corresponding to the top configurations of the Chinese characters and twenty-eight keys corresponding to bottom configurations of the characters, and the same set of selector keys is sufficient for selecting all characters and components, however composed. In addition, the keyboard may be provided with eight other keys by means of which the desired component or character can be selected and printed from the group which has been selected by manipulation of the top and bottom keys.

Chinese characters are highly stylized, and the characters are acceptable only when they are of conventional form. Therefore, it is necessary also to devise type arrangements by means of which acceptable characters can be formed.

In the usual type foundry, the components vary in width according to the internal structure of the parts. An absolute standardization of these components to a uniform width is necessary. I have discovered by statistical averages that the right hand component should be three-fifths and the left hand componet should be two-fifths of the square, and that fixing them at these respective widths achieves a most satisfactory result.

Furthermore, I have discovered that in order to achieve the effect of coherence and integration in the characters formed by combination, it is necessary to simulate the overlapping of strokes across the dividing line as actually takes place in the regular printer's types. I have found that, except in the case of two parallel vertical strokes which must not touch each other, it does not hurt, but helps, to have the horizontal and slanting strokes of the two parts touch each other. I have found that a composite picture of the seventy odd left hand components shows an empty space at the lower right hand corner. By actual tests, I have found it desirable to design the right hand components so that their horizontal and slanting strokes overlap in a sharply defined and carefully delimited area. Accordingly, in typewriters, printing, or type-forming devices embodying the present invention, the left hand components are arranged to take up approximately two-fifths of the square and the right hand component is arranged to take up approximately three-fifths of the square and, where necessary, to overlap beyond the three-fifths area to tie the two components together.

In a practical machine for typing, it is necessary to provide a suitable carrier for the printing types which will not be so bulky that it cannot be fitted into a typewriter of substantially conventional size. Obviously, if all the characters and their components which are required to print or form the complete Chinese written language were arranged on the surface of a drum, the drum would be large and heavy.

In accordance with the present invention, the types may be arranged on octagonal bars of suitable dimensions and a plurality of such type bars may be mounted in carriers on a rotatable frame so that the frame, hereinafter referred to as a printing cylinder, can be rotated and the individual type bars rotated independently to present the desired type to a printing position. Inasmuch as the printing cylinder is relatively heavy and has considerable inertia when moved, the paper and the paper carriage preferably are moved relatively to the cylinder in order to bring the selected type into proper printing relationship to the paper. Also, inasmuch as the Chinese language is printed in vertical rather than horizontal columns, a carriage is provided which moves the paper vertically during the spacing operations instead of horizontally, as in the case of the English typewriter.

Moreover, inasmuch as the type elements are fixed when they are brought into printing position, a printing hammer is required which always aligns itself with the character to be printed and thus moves with the paper carriage.

When two components are to be printed to form a single character, the paper should not move after the printing of the first or left hand component. In my device, mechanism is provided whereby shifting of the paper carriage or the paper thereon takes place only after both the left and right hand components, or a complete character, have been printed.

Another novel feature of my typewriter, which is also adaptable to other purposes, is the provision of visible means for making the final selection of the character or the component to be printed. Thus, for example, when one of the left hand components is to be printed, a key corresponding to the top configuration of the left hand component is pressed. In response to the operation of this key, the left hand components having the same top configuration (average of two per top key) i. e., 70 to 80 divided by 36, are shown visibly on the top of the typewriter and a visual selection can be made of this group by depressing a printing key, that is, one of the eight keys referred to above, to print the selected component. Under these circumstances, the paper carriage does not move, inasmuch as the character will not be completed until the right hand component has been printed adjacent to the left hand component. The right hand component may be selected from the approximately 1,300 types available, by depressing one key corresponding to the top configuration of that component and one of the twenty-eight keys having the same bottom configuration as the component thereon. This brings into view a visible index disclosing all of the components or characters having the same top and bottom configurations as those on the depressed keys, a group usually consisting of one to eight (average 4) characters or components. Then the corresponding key of the group of eight printing and selecting keys is depressed to cause the selected character to be printed. This last operation of the printing key will cause the paper to be spaced into a position for receiving the next character.

If the character is complete and cannot be formed of right and left hand components, only three keys are operated to cause the printing of this character and the indexing of the paper carriage to a position for receiving the next printed character. Common composite characters are also typed by pressing three keys when types for such whole characters are provided.

The above described system for selecting characters may be used in visible index systems, in printing telegraph instruments, typesetting devices by means of which the type can be selected automatically or in Linotype machines in which matrices carried by the drum may be presented to a casting device for receiving the type metal to produce the printing types.

For a better understanding of the present invention, reference may be had to the accompanying drawings in which:

Figure 6 is a plan view of the control mechanism for the type-carrying member illustrating one key and its connections for controlling the printing cylinder;

Figure 7 is an end view of the mechanism disclosed in Figure 6;

Figure 11 is a top plan view of a portion of the mechanism for controlling the position of the paper carriage of the device;

Figure 12 is a view in front elevation of the mechanism disclosed in Figure 11;

Figure 18 is a view in section taken on line 18—18 of Figure 11;

Figure 19 is a view in front elevation of the mechanism for controlling the paper carriage, shown partly broken away to disclose details thereof;

Figure 20 is a top plan view of the mechanism disclosed in Figure 19, also shown partly in section and partly broken away;

Figure 21 is a view in section taken on line 21—21 of Figure 20 and partly broken away of the mechanism disclosed in Figure 19;

Figure 22 is a view in vertical section and partly broken away disclosing the mechanism for actuating the printing hammer of the device and disclosing details of the paper feed mechanism and paper carriage;

Figure 23 is a partial plan view of the same mechanism;

Figure 24 is a view in elevation disclosing details of the same mechanism seen from the rear end of the machine with parts broken away to disclose the mechanism more clearly;

Figure 25 is a top plan view disclosing the visible selecting mechanism for the characters with the shutter therefor broken away to disclose details;

Figure 26 is a view in section taken on line 26—26 of Figure 25 with parts broken away to disclose details of the construction;

Figure 27 is a view in section taken on line 27—27 of Figure 26 with parts removed to disclose the structure more clearly;

Figure 28 is a view of the detail of the bars for actuating and exposing the cards bearing the characters to be selected visually;

Figure 29 is a detailed plan view of the edge arrangement of the index cards;

Figure 30 is a front elevation of the paper carriage illustrating the platen and the ribbon feed carried thereby with parts broken away to show details of the construction;

Figure 31 is a view in end elevation and partly broken away of the paper carriage with one of the type bars shown in section and a portion of the printing hammer illustrated in its relationship to the carriage;

Figure 32 is a view in cross section taken on line 32—32 of Figure 30;

Figure 32A is a plan view and 32B an inclined view of the paper carriage with portions broken away to disclose details of the ribbon supports and feed, and the traversing mechanism;

Figure 33 is a partial front elevation (plan view) of the paper (feed) carriage with the paper feed rollers disclosed in section and partly broken away;

Figure 34 is a view in section taken on line 34—34 of Figure 33 illustrating the mechanism for actuating the paper return and also showing details of the bottom warning bell;

Figure 35 is a perspective view of the drive mechanism for the typewriter and illustrating one printing key operated by the drive mechanism;

Figure 36 is a layout view of the differential mechanisms and brake of the drive mechanism, each of these mechanisms being shown in cross section to disclose details thereof;

Figure 37 is a view in end elevation of the brake mechanism, partly broken away to disclose details thereof;

Figure 38 is an end view of a differential mechanism used in the drive partly broken away to disclose details thereof;

Figure 39 is an end view of the other differential mechanism of the drive shown partly broken away; and Figure 40 is a diagrammatic illustration of the relationship between the size and extent of overlap of types corresponding to left hand and right hand components of Chinese characters.

The invention will be described hereinafter in relation to a typewriter, but the principles of operation of the invention are equally applicable to othehr devices for forming or printing characters. Typewriters and other devices to which the invention relates are equally useful for typing, forming or selecting the characters or symbols of such other languages as Japanese and the like in which symbols are used instead of or along with an alphabet. As the description of one embodiment of the invention proceed, it will be apparent that similar systems and similar mechanism may be used for selecting and setting types and for presenting matrices to a type-casting device. The selector keys may easily be applied to establishing circuits in a Teletype or radio typewriter. Therefore, the invention should not be considered as restricted to typewriters only, but instead should be considered as being directed to all forms of typewriting, printing or print-forming devices for printing or otherwise manifesting the Chinese language and other languages which are inherently difficult to classify and index.

Figure 1:
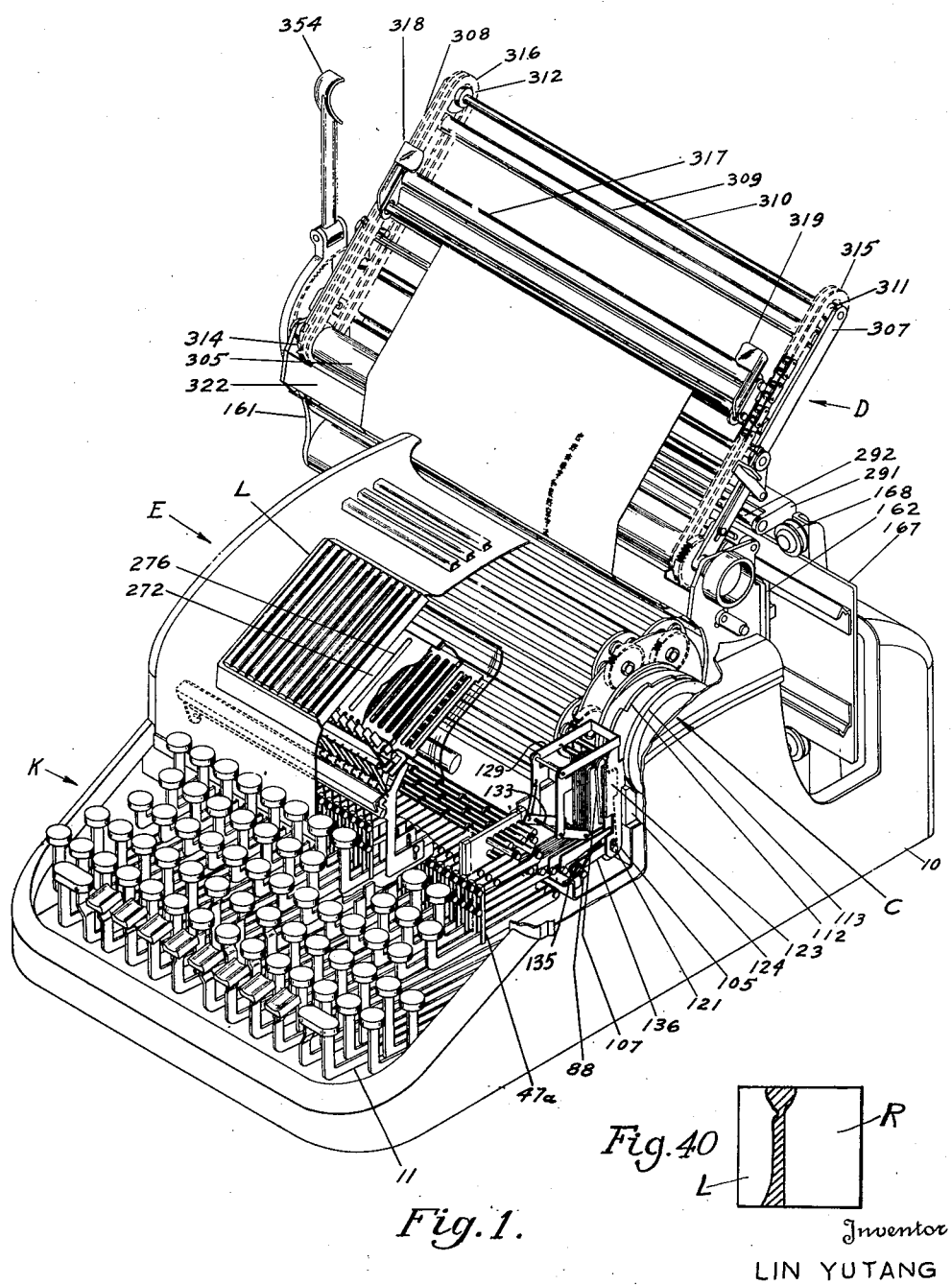
Figure 1 is a view in perspective and partly broken away of a typewriter embodying the present invention.

Referring now to Figure 1, the typewriter shown therein includes a frame 10 which is generally of conventional shape having an opening 11 in the front thereof in which are mounted the keys of keyboard K. In about the middle portion of the frame 10 is rotatably mounted a printing cylinder C which is disposed in front of a paper carriage D that is moved relatively to the printing cylinder C and carries the paper thereon to bring it into alignment with a selected character on the printing cylinder C.

Between the printing cylinder C and the keyboard is positioned a selecting mechanism E by means of which a final visual selection of a character or component thereof can be made to permit it to be printed on the paper carried by the paper carriage.

Figure 2:
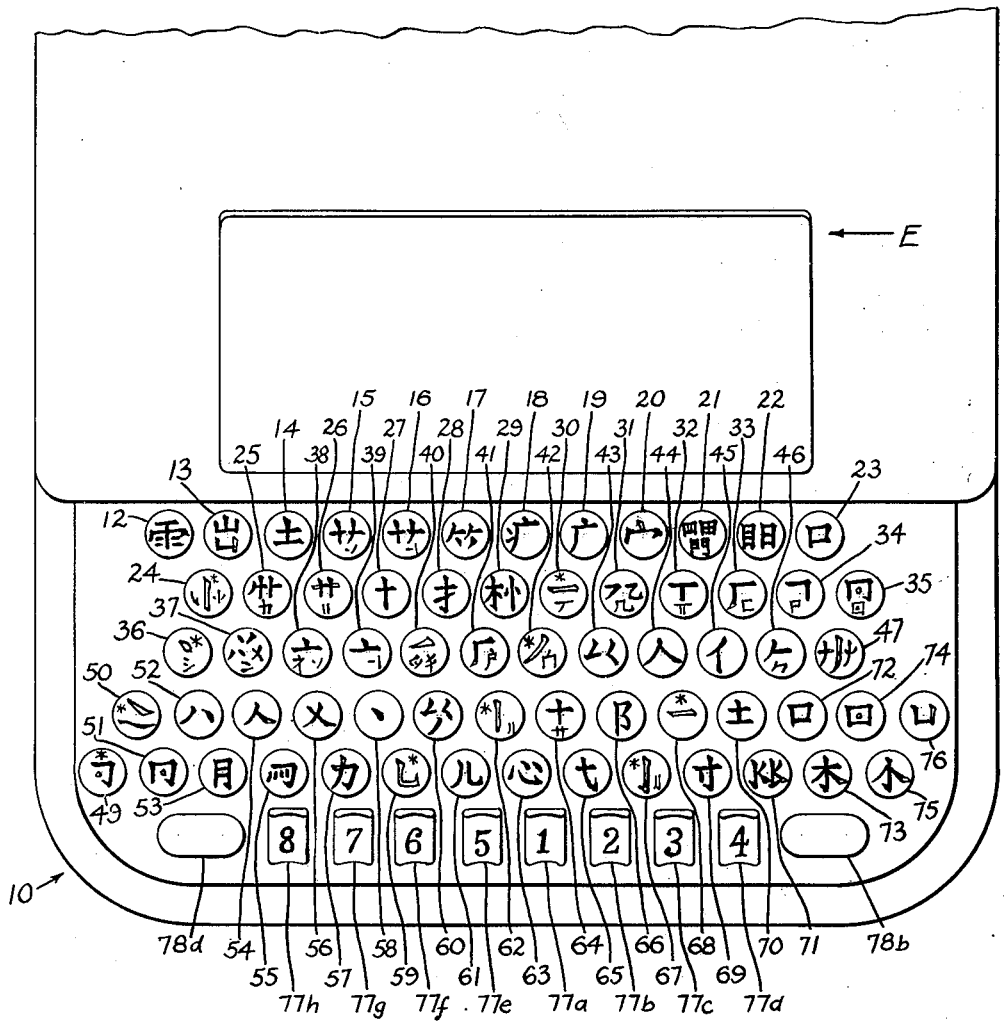
Figure 2 is a plan view of the keyboard of the typewriter and a portion of the casing therefor.

Referring now to Figure 2, the keyboard contains three rows of keys numbered 12 to 47 incluive, each key corresponding to and bearing a symbol consisting of the top strokes of a Chinese character or a component thereof. In addition, the keyboard includes two rows each of fourteen keys numbered 49 to 76, each of which bears a different symbol corresponding to the bottom strokes or bottom configuration of a Chinese character. Further, the keyboard includes a row containing eight keys 77a to 77h by means of which a selection can be made from a group of characters which are indexed into position by operation of keys in the above referred to five rows. At opposite ends of the row of keys 77a to 77h are two spacer keys 78a, 78b, either of which may be depressed to cause a spacing operation to take place.

By suitable operation of the various keys referred to above, and as described hereinafter, it is possible to select and print on the paper a Chinese character or a component which forms one of a large group of types mounted on the type bars of the printing cylinder C.

Figure 3:
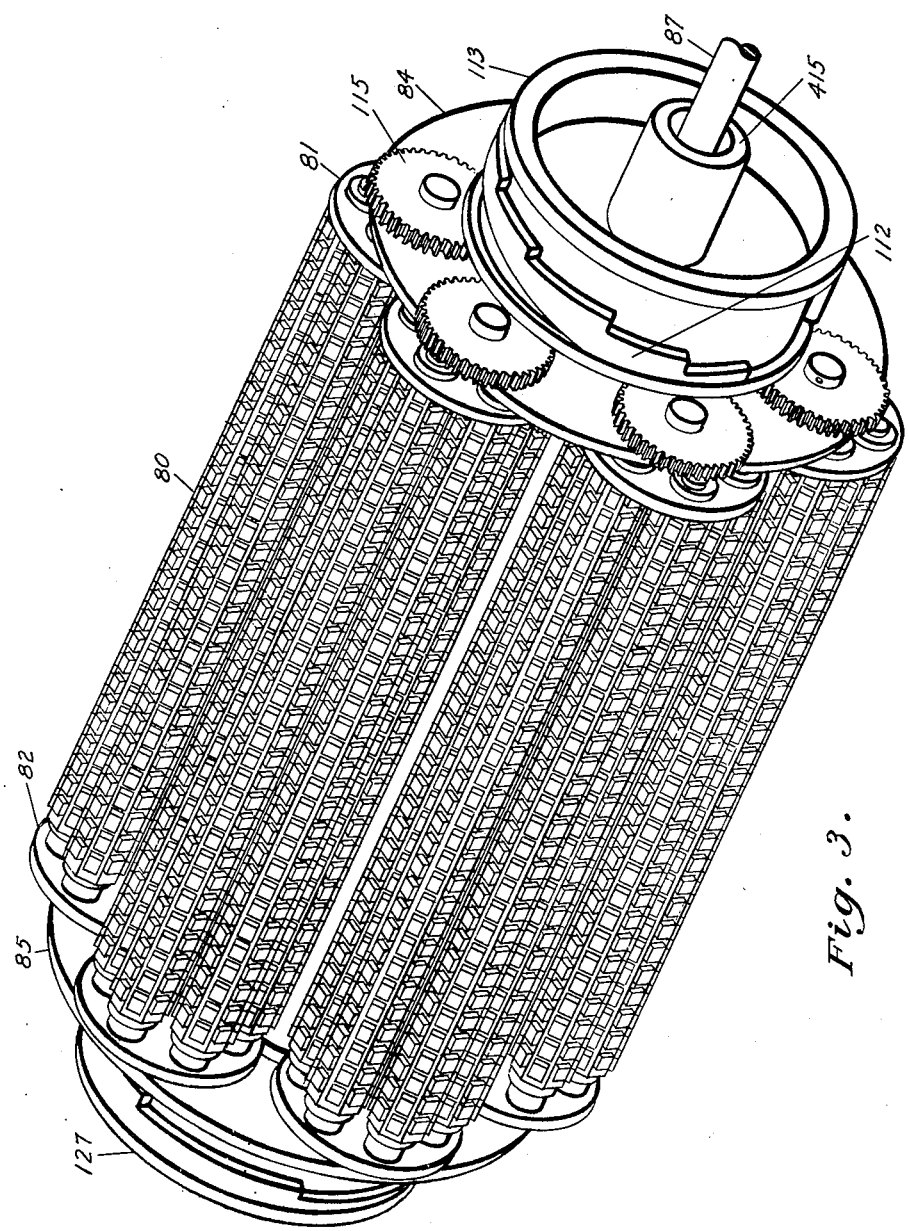
Figure 3 is a perspective view of the printing cylinder of the typewriter.
Figure 5:
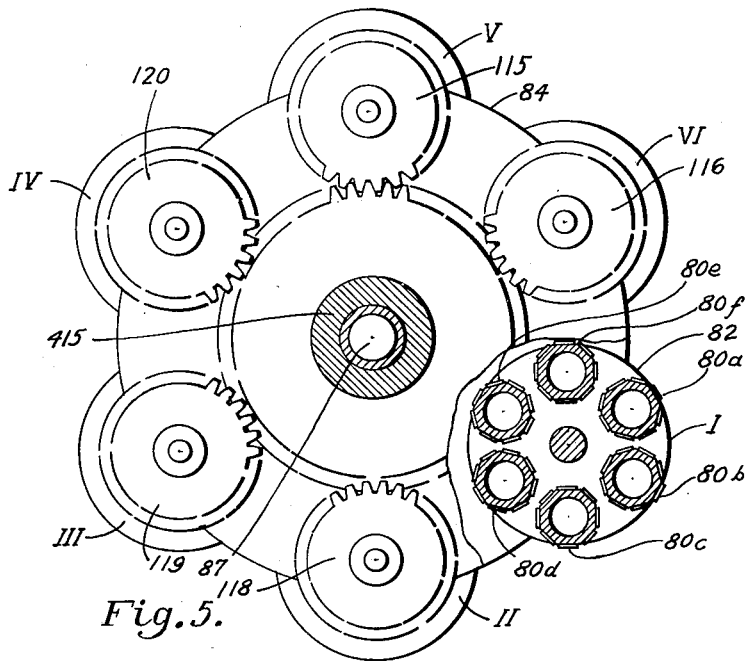
Figure 5 is an end view of the printing cylinder, partly broken away and partly in section, to disclose the structure of the type bars.
Figure 4:
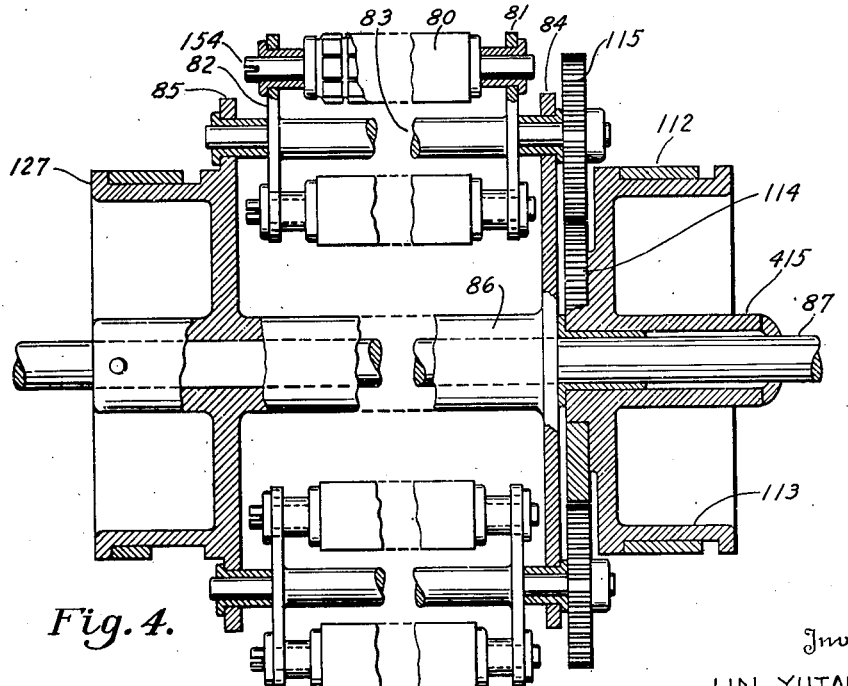
Figure 4 is a view in side elevation and partly in section of the printing cylinder.

The type-carrying cylinder C, as best shown in Figures 3, 4, and 5, is made up of a series of individual octagonal shaped type-carrying bars, six of these bars 80a to 80f being mounted in generally circular or disk-like end members 81 and 82 to form a unit. The end members 81 and 82 are connected by a shaft 83 which is journalled rotatably in disk-like end members 84 and 85 which form the end frames of the printing cylinder C. The end frames 84 and 85 are connected by means of a sleeve 86 in which is mounted a shaft 87 that supports the entire assembly in the frame 10 for rotation. As indicated particularly in Figures 3 and 5, each of the end plates 81 and 82 carries six octagonal type bars 80a to 80f, each face of which is provided with a row of characters or components of such characters. In addition, the end plates 84 and 85 carry six of the type bar assemblies or units I, II, III, IV, V, and VI, thereby making a total of thirty-six type bars in the printing cylinder C. Each row of type on the type bars 80a to 80c of each unit may contain twenty-nine characters or components thereof, thereby providing 8,352 spaces for characters or components, a total number of types which is considerably in excess of the number required to type all of the Chinese characters and components required for the Chinese language.

The various type bars and the individual type forms on the bars may be brought into position for typing in a manner described hereinafter. However, generally, the operation consists in rotating the printing cylinder C to bring a unit I to VI containing the type bars 80a to 80f into typing position, rotating the type bar unit to bring the desired type bar 80a to 80f into a printing position, further rotating the selected type bar to bring a desired character into a position for printing, and moving the paper carriage to such a position that the selected character or its component is in the proper position for printing on the paper.

The arrangement of the types on the thirty-six type bars is such that all of the characters or components having the same top configuration are carried on one of the bars 80a to 80f. Also, all of the various components or characters having the same top and bottom configuration are mounted in a row extending around the type bar, thereby providing in one row eight characters which can be selected for printing. In some cases, less than eight characters have the same top and bottom configurations and, as a result, a part of the row of types around a type bar may be left blank. In other cases, more than eight of such characters or components have the same top and bottom configurations, and the excess over eight is placed in another row where spaces are available.

The manner of selection of a specific unit I to VI and the specific type bar 80a, 80b, 80c, 80d, 80e, or 80f of that unit and the mechanism for accomplishing this result is best shown in Figures 1, 6, and 7.

Figures 6 and 7 illustrate the mechanism controlled by one key. For example, the key 47 is pivotally supported on a shaft 88 extending transversely of the frame and is provided with an upwardly extending link member 47a which engages the ends of the two levers 89 and 90. The lever 89 is mounted on a shaft 91 which is one of six shafts 91, 92, 93, 94, 95 and 96 extending transversely of the machine behind the keyboard. Six of the keys 12 to 47 are connected to each of the shafts 91 to 96, respectively, in the manner that key 47 is connected. Each of the six keys connected to any one shaft, for example the shaft 91, has a symbol of a configuration, the corresponding types of which are located on typebars of similar position within the units I to VI. The lever 90 is connected to a shaft 97 which is one of a group of shafts 97, 98, 99, 100, 101 and 102, these shafts being related to the configuration of the symbol on all the keys connected therewith and carried by the individual type bars 80a to 80f of one of the units I to VI. Each of the shafts 97 to 102 has six of the keys 12 to 47 connected therewith. The connections between the keys 12 to 47 and the shafts 91 to 102 are such as to provide thirty-six different combinations, each corresponding to a key and to a type bar on the printing cylinder C.

Referring again to Figures 6 and 7, the lever 89, upon depression of the key 47, rocks the shaft 91 in a counterclockwise direction and at the same time rocks the lever 103, also connected to the right hand end of the shaft, as viewed in Figure 6, upwardly. Downward movement of the key 47 also rocks the lever 90 and its shaft 97 to raise the lever 104, which is connected to the left hand end of the shaft 97. The function of the levers 104 and 103 is to adjust the position of the printing cylinder C into a printing position adjacent the paper so that the proper type bar 80a to 80f of a unit I to VI will be disposed adjacent the paper. This is accomplished by means of the catches or stops 105 and 106 adjacent opposite ends of the printing cylinder C. Each of the shafts 97 to 102 is associated with a separate stop member corresponding to the stop member 105. The six stop members 105, 107, etc., at the right hand side of the machine operate like the stop member 105 in the manner to be described. Stops 105 and 107 are shown in Figure 1, as are the slots. The stop members 105 and 107 cooperate with the stepped cam member 112 (Figures 3 and 4) which is carried on a drum 113 at the right hand end of the printing cylinder C. The drum 113 is rotatably mounted on the shaft 87 and is provided with a gear 114 which meshes with the gears 115, which are mounted respectively on the ends of the shafts 83 of the type-carrying end plates 81 and 82 of each of the units I to VI. The steps on the cam member 112 are so arranged that upon rotation of the type-carrying cylinder relatively to the drum 113, a selected one of the six octagonal type bars 80a to 80f connected to each gear is moved to the outermost printing position.

The stop members for cooperation with the stepped member 112 consist of the levers 105, 107, etc., which are slidably and rockably mounted on the cross pin 121 (Figure 1) which is carried by a frame 122 in the machine. The stop levers 105, 107, etc., thus are capable of up and down movement, as well as rocking movement, toward and away from the drum 113, as viewed in Figure 7. The lever 105, which is typical of the six levers, 105, 107, etc., is provided with a projecting portion 123 which bears against a bar 124 extending transversely of the machine so as to maintain the upper end of the member 123 out of the path of the steps 112 when the lever 105 is in its lowest position. The opposite side of the lever is provided with a projection 125 which is disposed in the path of the end of the lever 103.

Thus, assuming that all of the stop levers 105, 107, etc., are disposed in their lowermost positions, which usually is not the case, downward movement of the key 47 will lift the lever 105, for example, upwardly, disengaging the projection 123 from the cross bar 124 and allowing lever 105 to rock into engagement with the surface of the drum 113 in a position to limit the rotation of the drum 113.

The stop members 106, etc. at the opposite end of the machine are used to cause one of the six units I to VI to be brought into a proper position. Each of the shafts 97 to 102 is associated with a separate stop lever arranged similarly to the stop levers 105, 107, etc. Of course, when the key 47 is depressed, the shaft 97 is rocked and one of the stop levers 106, for example, is lifted and allowed to engage the surface of the drum 127 which is fixed to the opposite end of the type cylinder, as shown in Figure 4, and rotates with the end plates 84 and 85. The drum 127 is provided with a six-step stop band, each step corresponding to the position of one of the type bar units I to VI. Thus, when the shaft 97 rocks, for example, the stop member 106 is rocked to engage the drum 127 and allows rotation of the drum only to a position such that a group of six type bars or unit on which one type bar has top portions of the characters corresponding to the symbol on the key 47 is brought into position at the rear of the machine.

Inasmuch as it is necessary to make repeated selections, it is also necessary to withdraw the stop levers from engagement with the drum before another selection is made. This is accomplished by means of the bail member 129 at the right hand end of the machine and the bail member 130 at the left hand end of the machine. The bail members 129, 130 are pivotally mounted on the triangular members 131 and 132 at opposite ends of the machine. When in its advanced position, as shown in Figure 1, the bail member 129 engages behind the topmost ends of the levers 105, 107, etc. Also, the bail member 130 engages behind the uppermost ends of the six levers 106, etc., at the left hand end of the machine. The triangular members 131 and 132 are pivotally mounted on the pins 133 and 134 carried by the casing 122 so that they can rock around these shafts. Each of the triangular members 131 and 132 is provided with a shaft 132a which will engage any one of the series of levers mounted on the shafts 97 to 102 and corresponding to the lever 104 so that as the shafts are rocked, the triangular members rotate in a counterclockwise direction and draw all of the levers 105, 107, etc., and 106, etc., to the left. This withdraws the lugs corresponding to the lug 123 from engagement with the upper edge of the bar 124 and the levers are then pulled downwardly by means of the springs 135 (Figure 1), which engage the levers 136 carrying the pins 121. This withdraws all of the stop levers from engagement with the drums at each end of the printing cylinder C and releases these levers from the bails 129 and 130 after a predetermined counterclockwise rocking movement of the bails 129, 130. This withdrawing operation takes place at the beginning of the depression of any key 12 to 49. Immediately following, upon further depression of, for instance, key 47, only the stop levers 105 and 106 corresponding to the key 47 will be lifted up to be brought into engagement with the drum members 113 and 127 at the ends of the roller.

The above described operation of the keys in the top three rows will condition the machine to bring a type bar 80a to 80f of the units I to VI having all the characters or components of the same top configuration into a position at the rear of the machine and adjacent to the paper carriage D for a printing operation. However, the individual type bars 80a to 80f of the selected unit are not positioned to print a character at this time. As indicated above, each of the eight rows of types on the type bar 80 may contain as many as twenty-nine different characters or components thereof. Therefore, a further selection must be made of one type of each of the longitudinally extending rows of types and, further, a selection must be made of one of the eight rows of types on a type bar in order to print a selected type.

As indicated previously, it is preferable to move the paper carriage D relatively to the printing cylinder C in order to bring the type in position for printing on the paper in a desired location than it is to shift the cylinder C axially relatively to the paper. Therefore, mechanism is provided for selecting one row of type that extends around a bar 80a to 80f by movement of the paper carriage as will be described hereinafter. Also, it is necessary to select one type from the group of eight, or less, which extends in a row around each of the type bars 80a to 80f. In order to select one specific type from the rows on the type bar, mechanism is provided for rotating any one of the thirty-six bars through a distance corresponding to that required to bring one of the eight rows into position. This is accomplished by means of one of the eight selector keys 77a to 77h on the keyboard. It will be noted that there are eight of these keys which correspond directly to the eight rows of types on a type bar 80a, 80b, 80c, 80d, 80e, or 80f. Therefore, by pressing any one of these keys, the type bar may be rotated to present a selected row of type into printing position.

Figure 8:
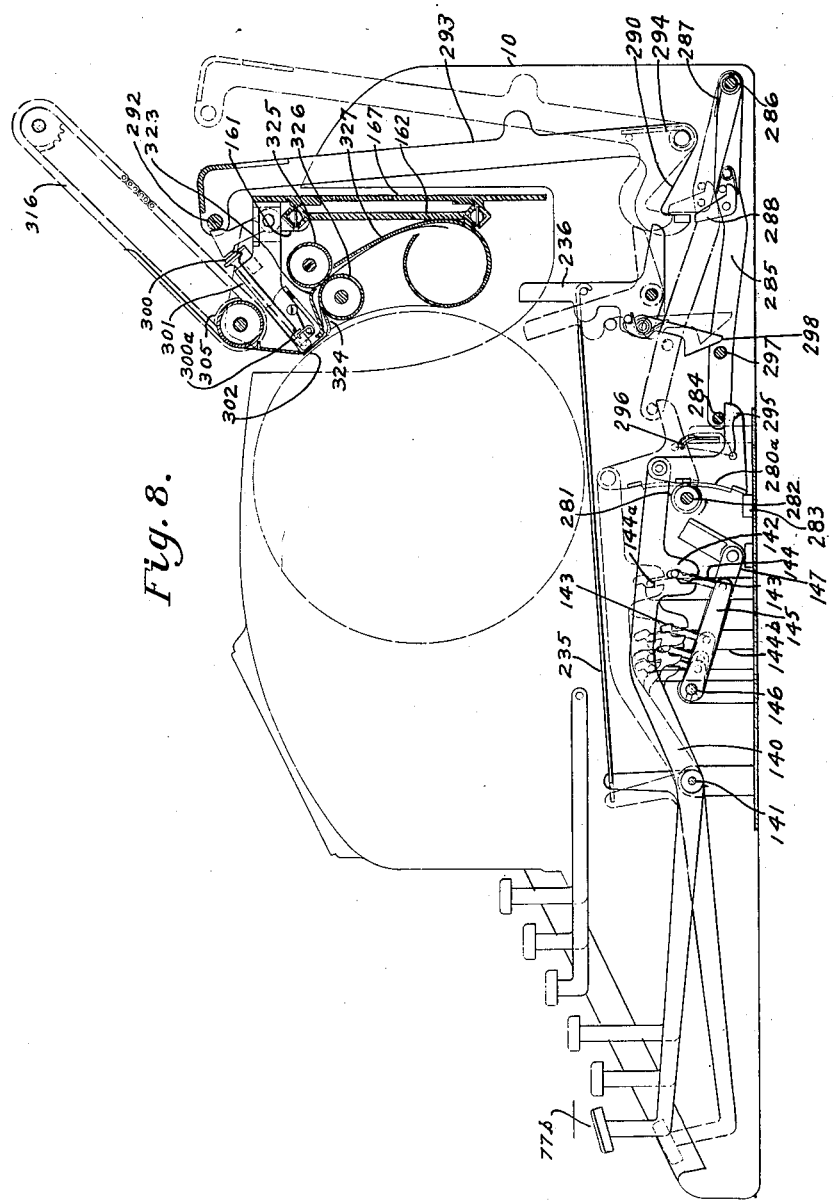
Figure 8 is a view in cross section of the typewriter of Figure 1 with parts removed and parts shown in dotted lines to illustrate details of the device.
Figures 9, 10:
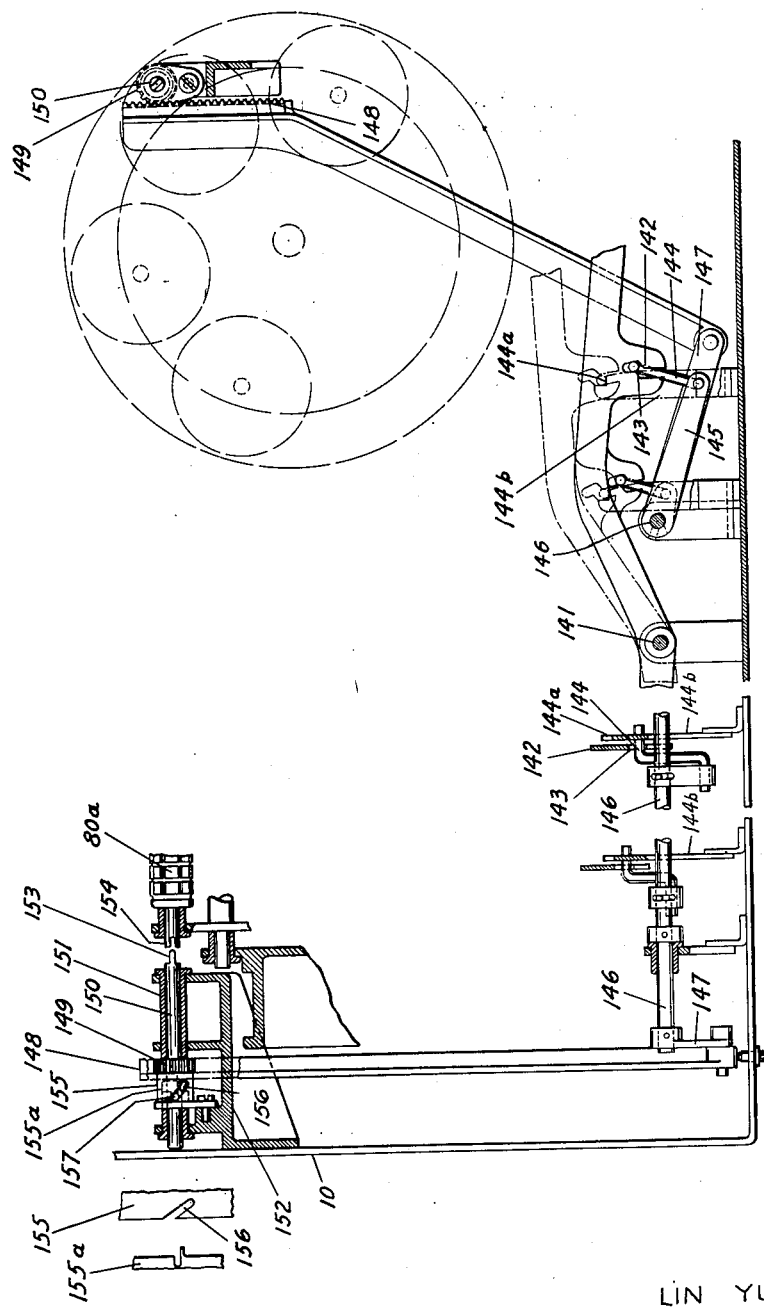
Figure 9 is a view in section of the portion of the device disclosing the connections for rotating the individual type bars.
Figure 10 is a view in front elevation and partly in section and partly broken away of the mechanism disclosed in Figure 9.

Referring now to Figures 8, 9, and 10, if one of the keys, for example key 77b, is depressed, it will rock the projecting lever arm 140 about the shaft 141 which extends transversely of the casing 10. All of the keys 77b to 77h have similar lever arms. The key 77a does not have a lever arm inasmuch as it corresponds to the row of types that normally is positioned for typing. The lever arm 140 is provided with a projection 142 having an irregular cam slot 143 therein for receiving the end of a link 144 that is connected to a lever 145. The lever 145 is mounted on a shaft 146 which extends transversely of the machine and carries at its left hand end another lever 147. The other keys 77c to 77h, inclusive, are provided with cam members 143 similar to the cam member 143, but as illustrated in Figure 8, these cam members are disposed at decreasing distances from the shaft 141 on which they are mounted and likewise they are connected to progressively shorter levers carried by the shaft 146 so that, upon equal rocking of the keys 77b to 77h, the shaft 146 will be rocked through progressively greater angular distances and, as a consequence, the lever 147 will be rocked through greater angular distances. The angular movement of the lever 147 determines the displacement of a rack member 148 which is connected to the lever 147 and meshes with a pinion 149 that is mounted on a shaft 150 (Figure 10). The shaft 150 is journalled in a sleeve 151 that is mounted in a bracket 152 connected to the casing 10 of the machine. The right hand end of the shaft 150 is provided with a noncircular key portion 153 which is adapted to engage in a slot 154 in the end of the type bar 80a, for example, that is in alignment with the shaft upon endwise movement of the shaft 150. Endwise movement of the shaft 150 is produced by means of a sleeve 155 that is fixed to the pinion 149 and has a slot 156 therein for receiving a pin 157 fixed to the shaft 150. Inside the sleeve 155 is situated the sleeve 155a with a slot for pin 157 preventing shaft 150 from turning until 153 is engaged in 154. Thus, as the rack 148 moves upwardly, the pinion 149 is rotated and the pin 157 moves along both slots causing the end 153 to engage in the notch 154 in the type bar. Continued rotation of the pinion 149 then will cause rotation of the type bar 80a through a distance depending upon which of the eight keys 77a to 77h is depressed. In the case of key 77a, the type bar is not rotated. During the printing operation, the type bar will be stationary as the upper parts of the links 144 will be deposited on the rests 144a of the upright members 144b which are secured to the frame 10. At the end of a printing operation the links will be pushed down from the rests 144a by the cutouts 143, and then the rack 148 will move in the opposite direction or downwardly, thereby rotating the type bar 80a to its starting position and retracting the key 145 from engagement with the type bar.

The functions and operation of the top keys 12 to 47 and the selector keys 77a to 77h have been described thus far. The following description covers the operation and the function of the keys 49 to 76 which select the proper group of types axially or longitudinally of the type bars. This is accomplished by shifting the paper carriage D and is shown more particularly in Figures 1, 8, and 11 to 21 inclusive. The paper carriage, as shown in Figure 1, includes a pair of end plates 160 and 161 which are connected by a transverse plate 162 to form a rigid structure. The transverse plate 162, as shown in Figures 1 and 22, is provided with bearings 163 and 164 at its upper and rear edges which engage in the rails 165 and 166, respectively, carried by a cross plate 167. The cross plate is, in turn, supported upon rollers 168 and 169 at each side of the frame for reciprocating movement transversely of the frame.

The paper carriage assembly described above including the cross plate 167, the back plate 162, and the end plates 160, 161 is adapted to move together as a unit, but relative movement between the cross plate 167 and the carriage including the plates 160, 161, 162 is also permitted in order to allow spacing of the characters transversely of the sheet.

In order to bring the paper in such a position that a vertical column of characters can be printed, as illustrated in Figure 1, and inasmuch as the Chinese language is typed in vertical columns from top to bottom and from right to left, means are provided for shifting the plate 167 bodily endwise to bring a selected character or component into the column being typed.

For the left hand components corresponding to the top configurations of the thirty-six component keys 12 to 47, endwise shifting movement of the paper carriage out of a central position is unnecessary, for the reason that depressing of any one of the thirty-six keys will ordinarily present to printing position not more than one or two components having the same top configuration. These left hand components, totalling seventy-eight, can be located in the center portions of the thirty-six type bars 80a to 80f of the units I to VI.

Figure 13:
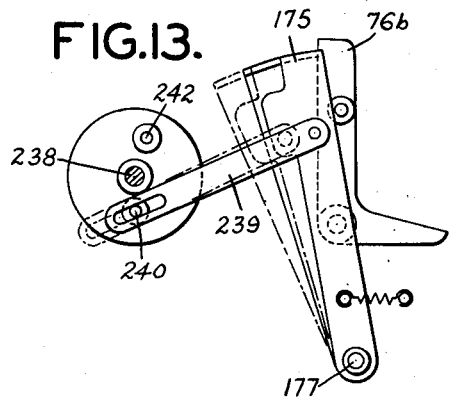
Figure 13 is a view in section taken on line 13—13 of Figure 11.
Figure 14:
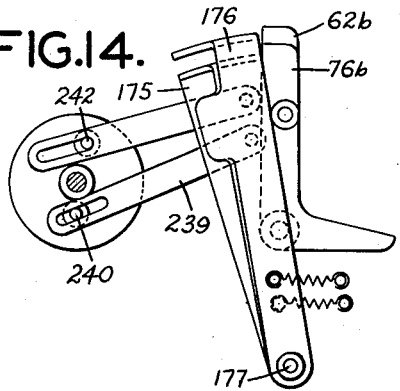
Figure 14 is a view in section taken on line 14—14 of Figure 12.
Figure 15:
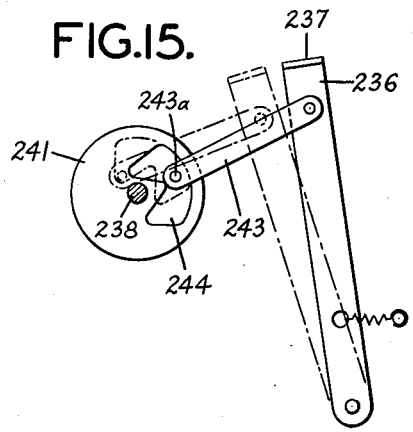
Figure 15 is a view in section taken on line 15—15 of Figure 11.
Figure 16:
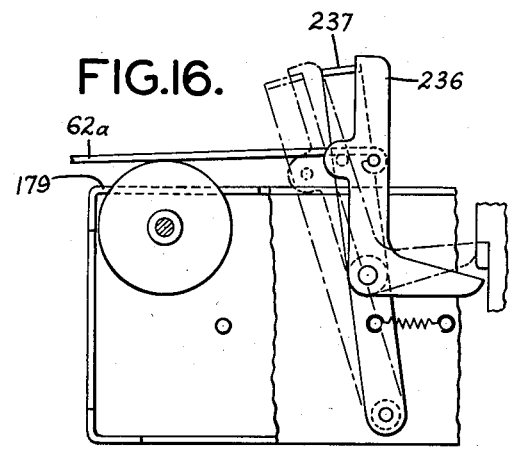
Figure 16 is a view in section taken on line 16—16 of Figure 12, a portion of the device being shown broken away.
Figure 17:
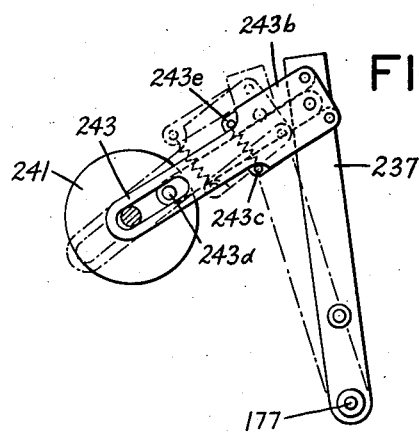
Figure 17 is a view in section taken on line 17—17 of Figure 12.

For selecting a composite character or a right hand component in which both the keys representing the top configuration and the bottom configuration must be operated, it is necessary to shift the paper endwise relatively to the type bars. The twenty-eight keys 49 to 76 are used for this purpose. Each of the keys 49 to 76 is connected by a suitable link 49a to 76a, respectively, to a series of levers 49b to 76b, as shown in Figure 12. The group of levers 49b to 62b is longer than the group of levers 63b to 76b inclusive, as shown in Figure 12, and each of the levers 63b to 76b cooperates with a U-shaped bail 175, as shown in Figure 13. The levers 49b to 62b, which are longer, are engageable with a U-shaped bail 176, as shown in Figure 14, and are so related angularly to the levers 49b to 62b that either bail 175 or 176 can be displaced independently. The bails 175 and 176 are pivotally mounted on the pins 177 and 178 which are supported on a framework 179 fixed to the base of the casing 10. Each of the levers 49b to 76b is provided with a rearwardly projecting finger which is adapted to engage a group of vertically slidable stop bars 180 to 207 (only the bars 193 to 207 being shown), each corresponding to one of the levers, as shown in Figures 19 and 20. As shown in Figure 21, the slidable bars 180 to 207 are mounted for up and down movement in slots in a transverse bar 208, all of these bars normally being urged downwardly by means of springs 209 connected to their lower ends and to the bottom of the casing 10. Each bar 180 to 207 may be lifted upwardly by depressing a corresponding key of the group of keys 49 to 76 to the position shown in Figures 19 and 21 through the rocking of the corresponding lever connected to that key, for example, lever 69b which is connected to key 69. During the upward movement of the bars 180 to 207, any other bar which is in an upper position is released and drawn downwardly. This is accomplished by means of the channel-shaped member 210 which extends across the machine behind all of the bars 180 to 207 and is pivotally mounted on pins 211 at its opposite ends. The channel member 210 is urged toward the bars by means of the spring 212 carried by the bar 203 and it cooperates with the detents 213 and 214 to retain any of the bars 180 to 207 in its upper position. However, if another of the bars 180 to 207 moves upwardly, the detent 213 thereon will back off the channel member 210 and will release any other bar that is in its upper position.

The bars 180 to 207 control the position of the paper carriage C in the manner best shown in Figures 19 to 21. The back plate 167, which supports the paper carriage, is provided with a forwardly projecting guide block 220 at its lower edge which carries a slidable stop member 221. As shown in Figure 20, the slide member 221 has opposed flanges 221a and 221b having their inner ends spaced apart a sufficient distance to pass by the ends of the bars 180, etc., on one side while it engages on the other side. When shifted upwardly, as viewed in Figure 20, the flange 221b is in a position to engage a stop bar 200, as shown. Similarly, when the slide 222 is shifted downwardly, as viewed in Figure 20, the flange 221a is in a position to engage a bar, for example the bar 200. Thus, in either direction of movement of the carriage-supporting plate 167, the carriage would be stopped in the same position by the stop bar 200.

The carriage is moved by means of a horizontal chain 222 which is supported on the sprockets 223 and 224 which are rotatably mounted on shafts fixed to uprights supported on the casing 10 of the machine. The sprocket 223 is driven in one direction by means of a shaft 225 by means of the bevel gears 226 and 227. Upon rotation of the shaft 225 in the direction of the arrow in Figure 19, the chain will be caused to travel in the direction of the arrow in Figure 20. The chain is provided with a plurality of upwardly projecting pins 228, 229, etc., which are adapted to engage the flange 221a or 221b, depending upon which one is displaced into a position to engage a stop bar 180 to 207. Thus, if, as shown in Figure 21, the flange 221b is in position to engage a stop bar 200, the flange 221a is in a position to engage one of the pins 228, 229, etc. Under these conditions, the carriage assembly, including the supporting plate 167, will move to the left until the flange 221b engages one of the stop bars. If the slide 221 is pushed forward, the flange 221b will then engage one of the pins 228, 229 and the carriage, including the plate 167, will be moved to the right until the flange 221a engages the elevated stop bar.

The position of the carriage with respect to any longitudinal row of types on a type bar 80a, etc., can be determined by depressing a key of the group 49 to 76. These types, therefore, must be arranged to correspond to the bottom symbol on each of the keys representing the bottom of a character or component thereof.

The above described mechanism is not sufficient in itself to make possible the selection of a character in a longitudinal row, inasmuch as it is not possible to predetermine the position of the carriage C at the conclusion of any typing operation. Accordingly, it is necessary to provide a steering mechanism which will assure the movement of the carriage to the proper stop bar and also to return it to its central position for typing the classifying component, which is selected by depressing one of the top group of thirty-six keys, as described above.

After one of the keys 49 to 76 is depressed, but a printing operation has not occurred, the slide 221 may be so disposed that the paper carriage would move in the wrong direction upon actuation of another key. In order to change the direction of travel, the device is provided with a two-part bell crank lever 230 mounted on block 220 having an end portion 230a that engages a pin 231a that is connected to the slide 221. Thus, if the carriage moves toward the left, as viewed in Figure 21, it will strike the fixed pin 232 and will rock counterclockwise, thereby shifting the slide downwardly, as viewed in Figure 20, or to the right, as viewed in Figure 21, and will cause the carriage to be connected to the lower or right hand flight of the chain 222, which, travelling in the direction of the arrow, will return the carriage toward the center position. The two parts of the lever 230 are biased into a right angular relation by means of the spring 230b which further aids in moving the slide 221 quickly. As shown in Figure 20, a flat rail 232a is provided adjacent the pin 232 to restrain the end 230a against movement until the spring 230b is stressed. When the end 230a leaves the rail 232a, the spring snaps the slide 221 to the forward position.

A similar fixed pin 233 and rail 233a are provided adjacent the opposite end of the chain for reversing the direction of travel of the carriage 167.

The return for the carriage to center position is controlled by a lever 236 (Figures 8, 11 and 12) which is not connected to any key. The lever 236 is longer than any of the other levers 49b to 76b and cooperates with the bail 237 which is also pivotally mounted on the pins 177 and 178. Upon movement of the lever 236, a stop bar 236b at the center of the group of bars 180 to 207 is raised upwardly and, at the same time, the bail 237 is rocked forwardly, as viewed in Figure 15. The function of the bails 175, 176, and 237 is to make certain that the carriage will move to its center position at the conclusion of a printing operation ready to type another component or character. This is accomplished by means of the connections between the bails and a shaft 238 which also controls the position of the slide 221. The bail 175 (Figure 13) is provided with a link 239 which has a sliding pivot connection with a pin 240 on a disk member 241. The bail 176 also is provided with a link 242 which has a sliding pivot connection with a pin 242a on the opposite side of the axis of the disk 241. Thus, if the bail 175 is rocked to the left, it tends to rotate the disk 241 in a counterclockwise direction when the pin is in the near end of the slot in the lever 239. Similarly, if the bail 176 is rocked to the left, the disk 241 may be rotated counterclockwise when the pin 240 engages in the end of the slot of the lever 241.

The bail 237 is likewise connected to the disk 241 by means of a link 243 having a pin 243a which engages in a generally W-shaped cam groove 244 in the disk. Thus, when the bail 237 is rocked, the link 243 may urge the disk either to the left or to the right, depending upon the portion of the cam slot 244 in which it is engaged at the time. The position of the link 243 is controled by a linkage system (Figure 17) which includes a central link 243a straddling the shaft 238 and a pair of links 243c and 243e which are pivotally mounted on a yoke that is supported by the bail 237. The ends of the links 243c and 243e are connected by means of a spring and are urged against opposite sides of the link 243, thereby urging it towards center position so that it can engage in either lobe of the cam 244, depending upon the rotated position of the latter. The position of the disk 241 is, of course, dependent upon the position of the shaft 238 which is connected by means of a lever and link 245 to the cam slide 221 and thus, in turn, is dependent upon the location of the stop bar that has been raised last with respect to the stop bar 236b. The disk 243 is retained in either of its rotated positions by means of a cam 238a (Figure 18) on the end of the shaft 238. A spring-urged lever 238b engages the cam 238a and normally urges it out of a dead center position.

The shaft 238 controls the position of the slide 221 by means of the levers 238c at its opposite ends (Figure 20) which are connected by means of links 238d to the opposite ends of the bar 238e. This bar is received in an opening in the slide member 221 (Figure 21) to shift it to its forward or rearward position in any displaced position of the slide along the stop bars 200 to 207, etc.

For example, if the stop bar 207 had been raised, the slide 221 would have been positioned to cause the paper carriage and the plate 167 to move to the left until the flange 221b engages the bar 207. In order to return the carriage, including the slide 221, to the middle position and in contact with the stop bar 236b, the slide 221 must be shifted so that it will engage a pin on the lower flight of the chain 222, as viewed in Figure 20, thereby urging the carriage to the middle position.

As indicated previously, the lever 236 is not connected to any key, but it is, in fact, responsive to a printing operation, as will be explained hereinafter.

At this point, it is desirable to explain how each of the selector and printing keys 77a to 77h is used to select the proper character for a printing operation. As pointed out before, the printing keys 77a to 77h are used to select one type from a row of types extending around a printing bar. In order to do this, it is necessary to provide some indication of the types that are in any annular row of types around each bar. This is done through the medium of the visible selector mechanism E on the device. The visible selector consists of a plurality of cards, each one corresponding to one of the thirty-six keys 12 to 47, and these cards being identified as 12a to 47a, as shown in Figure 25. Each of the cards is provided with twenty-nine slots 49c to 76c extending therethrough so that when all of the cards are stacked one on top of the other, these slots will be in alignment. Interposed between the slots in each card are spaces for receiving as many as nine Chinese characters or components mounted thereon. Thus, if one of the cards is shifted endwise, the twenty-nine rows of Chinese characters will be exposed through the aligned slots in the other cards. The mechanism for shifting any one of these cards consists of thirty-six cam bars 250, 251, 252, etc., all of these bars including an angular portion connected to a rearwardly directed member 250a, 251a, and 252a, each one of these rearwardly turned members being connected to a different one of the keys 12 to 47 inclusive through a pin and slot connection so that when a key is depressed, its corresponding cam bar will be moved downwardly. The inclined portions of the cam bars 250, 251, etc. are disposed in slots 253, 254, and 255, etc. in a transverse member 256 extending beneath the stack of cards referred to above. The upper ends of the cam bars engage in slots 257, 258, 259, etc. in tabs 269, 270, 271, etc. on the edges of the cards 12a to 47a. Only one of the cam bars can be elevated at one time by depression of separate keys because of the catch-and-release bar 250b (Figure 27). As shown in Figure 28, when a cam bar, for example the cam bar 250, is moved downwardly, the corresponding card is shifted to the right a sufficient distance to expose the characters and components on the cards through the twenty-nine slots in the cards overlying the card being shifted. Inasmuch as this would expose 261 characters or components, or less, mechanism must be provided for reducing this number to those present in one row of types around a type bar. This is done by means of a shutter 272 which is supported on sprocket rolls 273 and 274 at opposite ends of the card support member 275 (Figure 27). The shutter 272, as shown in Figure 1, is provided with a single slot 276 and this shutter is so arranged and connected with the carriage plate 167 that it travels with the carriage back and forth so that the slot 276 corresponds in position to the position of the carriage in its printing position. Accordingly, only one row of characters is actually exposed to view at one time.

A magnifying lens system L overlies the cards to render the exposed characters or components more readily visible. The lenses preferably magnify transversely principally so that the characters or components may be made rectangular rather than square on the cards to fit the area exposed by the slots in the cards.

As indicated previously, when only the left hand component of a character is to be printed, the carriage plate 167 is in its center position and so also is the shutter slot 276 so that the left hand components, being grouped in the centers of the type bars 80, are the only ones exposed to view for selection by means of the keys 77a to 77h. All that is necessary, therefore, to print a left hand component is to press the corresponding selector and printing key 77a to 77h, thereby causing rotation of the selected type bar to the proper position and printing, as explained previously.

On the other hand, when a right hand component or a complete integral character is to be printed, a top key of the group 12 to 47 and a bottom key of the group 49 to 76 are pressed which will cause selection of the proper type bar and the shifting of the carriage, as described above, to position the paper adjacent the row of type around a type bar which will contain the character or component to be selected. Such movement of the carriage and the shutter 272 will expose the characters to be printed and a cross index if there are more than eight characters in the group. The cross reference will indicate the proper key of the group of keys 49 to 76 to shift the carriage to a row of types containing the desired type.

The printing operation is mechanically controlled, preferably by an electric motor drive, and will be described presently. The actuation of one of the printing keys 77a to 77h will cause the printing operation to take place, as indicated before. Referring now to Figures 8 and 35, a printing key 77h, for example, carries a loosely supported L-shaped link member 280 on its inner end. The link member 280 has an arcuate inner surface 280a which is disposed adjacent a driven friction roll 281 that is mounted on a driven shaft 282. In the position shown in Figure 8, the link member 280 is normally maintained just out of engagement with the roller by means of a block 283 fixed to the bottom of the casing 10. The right hand end of the L-shaped link member engages a cross-bar 284 on a lever 285 which is pivotally supported on a shaft 286 extending across the back of the casing. The lever 285 is normally urged downwardly by means of a spring 287 to maintain the crossbar 284 in engagement with the L-shaped member 280 on the key. The lever 285 also carries a pawl member 288 which is disposed beneath a hook-shaped extension 290 on a lever 291 which supports one end of a hammer bar 292 extending across the back of the machine, as shown in Figure 1. The hammer bar 292 is supported at the opposite side of the machine by a similar lever 293 (Figure 20). Assuming that the shaft is being driven in the direction of the arrow, when the key 77h or any other of the keys 77a to 77g is depressed, the L-shaped link member 280 will be lifted and will clear the edge of the block 82. The pressure of the lever 285 on the link 280 will swing the latter against the roller 281 and the roller will proceed to depress the key 77h farther and to lift the lever 285. As a result, the pawl 288 will engage the hook-shaped element 290 and will rock the hammer bar 292 to the dotted line position, at which time the pawl 288 will disengage itself from the hook-shaped extension 290 and will allow the hammer bar to swing forwardly under the biasing action of the spring 294. At the same time, the L-shaped member 280 will have swung up to the dotted line position so that the pin 295 thereon will be disposed above the cam plate 296. Upon attaining this position, the pin will strike the spring 296 and will draw the arcuate drive surface 280a out of contact with the roller 281, allowing the key 77a to move up to its proper position because of the action of the lever 285 and the spring 287. As the lever 285 moves downwardly, the cross bar 297 thereon will engage the latch 298, which is pivotally supported on the lever 236 in the middle position of the carriage control bars and will rock the lever 236 counterclockwise, thereby elevating the stop member 236b, retracting all of the other stop members and rotating the shaft 238 by means of the bail 237 (Figures 11 and 20) to shift the slide 221 so that the plate 267 and the paper carriage will return toward center position with the slide 221 in engagement with the stop member 236b.

None of the other levers 49 to 76 include the hook 298, so that only the stop bar 236b will project after a printing operation has been concluded.

The hammer bar 292 extends entirely across the back of the machine so that it will be in a position to engage the hammer pin 300 (Figure 8) by means of which an impression is made on the paper. The hammer pin 300 is mounted in a sleeve 301 connected to the back plate 167 and is inclined at such an angle as to force the paper against a selected type on the printing cylinder C. The hammer pin has a rounded inner end 300a which rockably receives a cap member 302 so that this cap member can adjust itself to make up for any inequality of the surface of the type.

The manner in which the paper is supported and advanced with relation to the carriage will now be described.

The structure of the paper carriage C and other elements is best shown in Figures 8, 22, 23, 24 and 30 to 34. The paper carriage includes the side plates 160 and 161 which support the feed roller or platen 305 which has an adjusting knob 306 connected to its right hand end. The shaft of the feed roller 305 supports two rearwardly and upwardly inclined bars 307 and 308 which are connected by one or more cross bars 309 and carry at their upper ends a rotatable shaft 310 having the sprockets 311 and 312 thereon. Other sprockets 313 and 314 are mounted at opposite ends of the roller 305 and support, with the sprockets 311 and 312, the feed chains 315 and 316 (Figure 1). The feed chains are provided with a transversely extending resilient clip 317 which may be opened by means of the thumb levers 318 and 319 at its opposite ends so that the end of a sheet of paper may be gripped therein. The roller or platen 305, as illustrated in Figure 33, is hollow and a coil spring 320 is interposed between it and the shaft 321 which extends through the roller so that when the paper is in its lowest position, the spring 320 is wound up and normally tends to urge the clip 317 upwardly through the medium of the chains 315 and 316.

The lower end of the paper, as best shown in Figures 8 and 30, passes over a supporting plate 322 extending substantially tangentially to the roller 305, then rearwardly substantially parallel or tangential to the surface of the drum to another S-shaped plate 323 below the end of the hammer pin 300. A parallel guide plate 324 is also provided. The plates 322, 323, and 324 are connected to the side plates 160 and 161. Disposed behind the guide plates 323 and 324 are a pair of hollow tensioning rollers 325 and 326 which guide the paper into a scroll-shaped paper receiver 327 disposed below them and extending from one side plate 160 to the other side plate 161. As shown in Figure 33, the rollers 325 and 326 are hollow and are mounted on the shafts 328 and 329. The shaft 328 is journalled in the side plates 160 and 161. The roller 326 may be rocked out of engagement with the roller 325 by means of the levers 333 and 334 which are mounted on the transverse shaft 335 and which have an eccentric pin or pins 336 thereon engaging one or both of the levers 330 and 331.

At the right hand end of the roller 325, a conical friction clutch surface 337 is provided which engages a complemental conical clutch surface 338 carried by the sleeve 339 which is mounted on the shaft 328. A similar clutch mechanism 340 is located at the opposite end of the cylinder 325 and these two clutching elements are normally urged into engagement by means of the spring 341 connected to the shaft 328 and the sleeve 342. Thus, the roller 325 is capable of rotation relatively to the shaft 328. Similarly, the roller 326 is rotatable relatively to the shaft 329, under frictional restraint. The rollers 325 and 326 in combination with the clip 317 maintain the paper under tension. Of course, there is some slackening of the paper due to the impact of the hammer pin 300 when a printing operation takes place. In order to overcome this slackening, the sleeve 339 is provided with a grooved pulley 343 which is engaged by a complemental cut-off-disk member 344 (Figure 34) carried by the gear 345 which is geared to the gear 346 on the roller 305 by means of a gear referred to hereinafter. The disk 344 is springbiased by means of a spring 347 in such a direction as to maintain tension on the paper. Thus, the disk 344 can give when the paper is struck by the hammer shoe 300a but will rotate the roll 325 in a reverse direction to take up any slack that is created. Two similar friction ratchet mechanisms 350 are mounted at the left hand ends of the rollers 325 and 326 to limit the pull on the paper to the tension created by the friction clutches 337 when the paper is pulled upwards by the clip 317.

The paper normally will be started with the clip 317 near to the printing cylinder C and will move upwardly as each character is printed. In order to indicate when the paper has reached the uppermost position, the chain 315 is provided with a removable and displaceable deflecting member 351 which engages a striking lever 352 carried by the side bar 307. The striking lever is disposed adjacent a bell 353 so that when the deflecting member 351 strikes the lever 352, it will rock the latter clockwise, as viewed in Figure 34, and when it passes beyond the lever 352 it will release the lever to strike the bell 353.

The paper, the major portion of which initially was disposed within the scroll 327, may be returned to the scroll and the carriage spaced by means of the carriage return lever 354 at the left hand end of the paper carriage. The lever 354 is pivotally connected to a gear sector 355 which is pivotally mounted on a pin 356 carried by the end plate 161. The sector 355 meshes with the pinion 357 on the end of the shaft 321 so that when the lever 354 is pulled forwardly, the roll 305 and the roll 325 are rotated in a direction to feed the paper down into the scroll-like receiver 327. An overrunning clutch is interposed between the pinion 357 and the shaft 321 to permit return of the sector 355 to its upper position. Also, as the return lever 354 approaches its lowermost position, it is arranged to strike a roller 358 (Figures 30 and 32A) with a cam 359 (Figure 33) to displace the L-shaped lever 360 on which the roller 358 is mounted, to the right. The L-shaped member 360 is supported by parallel links 361 and 362 on the side frame 161 of the carriage. The link 362 is extended and has its end engaging in a slot 363 in a slide bar 364 which carries a pawl member 365 thereon. The slide bar 364 is guided in guide members 366 and 367 which are secured to the cross plate 162 extending between the end members 160 and 161. The pawl member engages a rack 369 which is fixed to the plate 167. A spring urged ball catch 365a, mounted on the back plate 162, engages the rack 369 to cause the elements of paper carriage C to move with the plate 162. Thus, when the L-shaped member 360 is pushed to the right, as viewed in Figure 30, the pawl 365 will engage one of the teeth of the rack 369 and, upon downward movement of the return lever, it will be urged against the rack displacing the paper carriage bodily to the right relatively to the back plate member 167. The number of spaces provided by this operation can be controlled by the slide 370 which extends between the pawl 365 and the rack 369 and limits the extent of engagement between these two elements during the movement of the bar 364. The spacer control bar 370 can be moved to one of two positions for single or double spacing by shifting it endwise.

It is necessary to place the ribbon between the paper and the printing cylinder C. As best shown in Figures 30, 31, 32A, and 32B, the ribbon R extends across the entire front of the paper carriage and is supported by spools 371 and 372 which are mounted in the carriage. As shown in Figure 32B, the spool 371 is mounted on an L-shaped lever 372a which is pivotally supported on a bracket 373 on the side frame 160. The L-shaped member 372a has a roller 374 at its outer end around which is looped the ribbon R. The lever 372a may be biased by means of a spring 375 to its outer unloading position, as shown in dotted lines, or to an inner operating position, as shown in full lines. In order to drive the spools as the typing proceeds, a transverse shaft 376 is provided having the worms 377 and 378 thereon which may be meshed alternately with the worm gears 379 and 380 on the spool spindles. The shaft 376 is driven by means of a suitable gear 378a driven by the gear 345.

Gears 346, 346a and 345 transmit rotation of the roll 305 to the roll 325. The ratio of the gears 345 and 346 is such that the paper while being moved down is under the tension created by the friction device 337, the circumferential speed of roller 325 being slightly more than that of platen 305.

The shaft 376 is mounted for endwise movement to drive one or the other of the spools 371 and 372. The shaft is maintained in one or the other positions by means of a spring-biased roller 381 which engages on one side or the other of a double cone roller 382 fixed to the shaft 376. Thus, the spools, for example, the spool 372, may be driven until the end of the ribbon is reached on the spool 371, at which time the resistance to movement is sufficient to displace the shaft 376 endwise, thereby disengaging the gears 378 and 380 and engaging the gears 377 and 379, which will then cause the device to drive in the opposite direction. Suitable brakes 383 are provided for engaging the spools to maintain the ribbon under tension (Figures 30 and 32B), and are alternatively released by the movement of the shaft 376.

Having described above the operation of the various keys, the operation of the power mechanism for operating the device will now be described. As indicated previously, the device preferably is motor-driven. To that end, an electric motor 400 or other power source, such as a spring motor or crank, is mounted within and on the base of the casing 10. The motor through a reduction gearing and the pulleys 401 and 402 drives the shaft 282 (Figures 8 and 35). As indicated previously, the shaft 282 is provided with a series of rollers 281, one roller for each of the eight selector and printing keys 77a to 77h. Only one of these rollers 281 is disclosed, however, for purposes of clarity. The right hand end of the shaft 282 is provided with a differential mechanism 403, which is best shown in Figures 36 and 38. The shaft 282 drives a sun gear 404 which meshes with the planet pinions 405 that are mounted on a drive gear 406. An internal gear 407 is similarly connected to a sprocket 408, both of the sprockets 406 and 408 being rotatable relatively to the shaft 282, but under certain conditions driven thereby. The sprocket 406 is connected by means of a chain 409 to the sprocket 410 which drives another differential gear 411. The sprocket 410 acts as a carrier for the planet pinions 412 which mesh with a sun gear 413 fixed to the shaft 87 (Figures 3, 4, 5, 36 and 39) and with an internal gear 414 which is fixed to the sleeve 415 on which is mounted the drum 113 (Figures 3, 4 and 5).

The sprocket 408 (Figures 35, 36 and 37) is connected by means of a chain 416 to a sprocket 417 on a braking or slip-clutch device 418. The sprocket 417 is connected through a multiple disk clutch or brake 419 to the shaft 420 which, in turn, is connected through the bevel gears 225 and 226 (Figures 19, 20 and 35) to the carriage drive chain 222. Thus, in operation, the shaft 282 is driven continuously, with the result that the sprockets 406 and 408 tend to be driven. However, when the shaft 87 and the sleeve 415 are restrained against rotation because the steps 112 and 127 are engaged by the stops 105 and 106, for example, the drive must take place to the sprocket 417. If the carriage chain 222 is likewise stopped, then the power of the motor is dissipated through the brake mechanism 418. However, the full motor power is available at all times to operate any of the mechanisms. Thus, when a key of the group 12 to 47 is depressed thereby shifting the stop members of the 105, etc. and 106 series to permit rotation of the printing cylinder C, the motor drives the shaft 87 and the sleeve 415 until the stop levers engage their respective steps on the drums 113 and 127. Likewise, when one of the stop levers 180 and 207 moves upwardly, the chain 222 is freed for movement to shift the carriage and the chain can move until one of the stop flanges 221a or 221b engages the newly elevated stop bar of the series of bars 180 to 207 or the bar 236b.

When a character including a left hand component and a right hand component is to be printed, the paper should not be spaced following the printing of the left hand component so that the right hand component can be printed in its proper relation to the left hand component. The mechanisms for accomplishing the printing without a spacing operation and the mechanism for regulating the spacing are best shown in Figures 22 to 24. When, for example, one of the keys 12 to 47 is depressed, in the normal course of operation the paper carriage will be in its center position, as indicated above, and the lever 236 will have been rocked to raise the stop bar 236b in a position to retain the carriage in its center position. When one of the printing keys for selecting the component is depressed, the lever 425 will be in the dotted line position shown, inasmuch as this lever is pivotally connected to the stop bar 236b. The lever 425 is pivotally mounted on a shaft 426 carried by a bell crank lever 427 fixed to a shaft 428 extending transversely of the casing 10. The lever 425 is connected at one end to the stop member 236b and at its opposite two ends to two links 429 which have their upper ends connected to two similar pivotally mounted triangular members 430. The pivotally mounted triangular members carry a cross bar 431 which extends across the back of the machine. The triangular members are supported on the pivot pins 432 connected to the hammer bar levers 291 and 293.

The cross bar 431 can be positioned to engage in an inclined cam slot 433 on an L-shaped member 434 (Figure 22) which is supported at one end by a pivotally mounted link 435 connected to the carriage plate 167. The other end of the L-shaped member 434 is slidable longitudinally on a cross bar 436 extending along the paper carriage and fixed at the ends of two levers 436a which are mounted on two pins 437 supported on the end plate 161 of the carriage. The bottom of member 434 slides in a slot of part 220, the top in slot 434a, so that 434 moves longitudinally with the back plate 167. The pin 437 is provided at its opposite end with a short lever 438 which is connected by means of a link 439 to one end of an escapement lever 440 which cooperates with the ratchet wheel 441 of the escapement which is connected to the end of the paper feed roller shaft 321, as shown in Figure 33. Thus, when the hammer bar 292 is swung outwardly to the dotted line position with the cross bar 431 in the position shown in full lines, the escapement is actuated to advance the paper following a printing operation. When the lever 425 is in the dotted line position, 236b being raised, the triangular member 430 is rocked to the lowest dotted line position so that the cross bar 431 cannot engage in the slot 433. As a result, when the hammer bar 292 is swung backwardly, the escapement is not actuated and the paper does not advance.

A spacing operation can be accomplished with a spacer key 78a or 78b by a similar operation and without printing, inasmuch as the spacer key 78b, as shown in Figure 22, is connected by means of a link 450 to the bell crank lever 427 so as to rock the entire lever 425 upwardly to the dotted line position. This upward movement of the triangular member 430 caused by the movement of the link 429 will displace the L-shaped member 434 without movement of the hammer bar 292 and will allow the escapement to advance the paper one step.

The upper part of the paper carriage can be collapsed by means of the thumb lever 451 mounted on the carriage bar 307. This lever 451 is connected by means of a link 452 to a pair of supporting levers 453. Movement of the lever 451 unlocks the hinge 451a as well as the supporting lever 453 so that the upper part of the support 307—308 can be folded downward and the lower parts of 307—308 turned around 321. When the upper parts of 307—308 are stored in the back of case 10, pins 451b prevent the chains 315 from getting loose.

In operation, let it be assumed that a composite character, including a left hand component and a right hand component, is to be printed. To accomplish this operation, one of the keys 12 to 47 having the same top configuration as the left hand component of the character is depressed, with the result that the printing cylinder C may be rotated and a type bar assembly rotated relatively to the cylinder C to bring the type bar adjacent to the paper carried by the paper carriage. As explained above, this is accomplished by means of the stop levers 105, etc. and 106, etc., which are actuated by the key depressed and always bring the corresponding type bar to its printing position under the action of the motor 400 and through the rotation of the drum shaft 87 and the sleeve 415.

The paper carriage D will be in its center position for the reason that the stop bar 236b is projected to engage the slide member 221 and thereby hold the carriage plate 167 in its center position. At the same time, the visible index card corresponding to the key depressed will be moved into view through the slot 276 (Figure 1) in the curtain 272 which is in its center position. A group of characters and components will be presented to view and, assuming that the component desired is shown in the next to the top most position, the selector key 77e will be depressed. Upon depressing the printing key 77e, the corresponding drive roller 281 will engage the L-shaped member 280 connected with the key and will lift it upwardly, at the same time rotating the shaft 146 (Figures 8, 9 and 10), thereby engaging the shaft 150 with the selected type bar 80a to 80f and rotating it to the second position in which the desired component is presented to the paper. At the same time, the printing hammer bar 292 will be forced backwardly by the pawl 288 (Figure 8) on the lever 285 to the dotted line position and then released for forward movement to strike the hammer pin 300 and print the component on the paper. As described above, however, the stop bar 236b will be in its uppermost position so that the triangular member 430 and the cross bar 431 (Figures 22, 23 and 24) will not engage the slot 433 in the escapement control member 434 and the paper will not be advanced.

The paper remains in position to receive the right hand component of the character. One of the keys 12 to 47 having the same top configuration as the top configuration of the right hand component is depressed. Then one of the keys 49 to 76 having the same configuration as the bottom configuration of the right hand component is depressed. This action, as described above, will elevate one of the stop bars 180 to 207 and depress the stop bar 236b. As a result, the cross plate 167 carrying the paper carriage will move from the center position into a position right or left into engagement with the stop bar, the slide 221 (Figures 19 to 21) being shifted at the same time to engage the chain and carry the carriage into engagement with the elevated stop bar through the rocking action of the shaft 238 (Figures 11 and 20). This action shifts the paper into a position for receiving one of the row of types extending around the type bar.

The selection of the specific type from the group of eight, more or less, is made by referring to the visible index which has a row of characters or components now exposed through the slot 276 in the curtain or shutter 272 at a point other than at the center of the machine. The desired character is then printed by depressing one of the keys 77a to 77h corresponding to the location of the desired character.

Sometimes there are more characters having the same top and bottom configuration than can be received in one row of type around a type bar and, in this case, a cross index is provided telling which key should be depressed in order to print the character. When the proper keys of the group 49 to 76 and of the group 77a to 77h are depressed, a printing operation takes place, as described above, with the exception that a spacing operation follows the printing operation. Referring now to Figure 22, it will be observed that at this time the centering stop bar 236b will be depressed, with the result that the triangular member 430 is elevated and the cros bar 431 engages in the cam slot 433. Therefore, when the printing hammer travels backwardly, the escapement is actuated by reciprocation of the member 434 and the character is printed and the paper is advanced one step.

The spacing operation, without printing characters, has been described above and is produced by operation of a spacer key 78a or 78b.

One of the features of the applicant's invention is the design of the components of the types in which the left hand component takes up only two-fifths of the square occupied by an entire Chinese character, while the right hand component takes up three-fifths of this area and may overlap into a portion of the left hand character. Also, horizontal and diagonal strokes may be formed on the right hand character which extend over into the left hand character so that when printing composite characters, these two characters are properly integrated and are in acceptable form for printing the Chinese language. Figure 40 of the drawings illustrates diagrammatically the areas of the left hand component L and the right hand component R. The shaded area shows the extent of overlap of the components L and R. If the square in which the character is formed is 20 mm. square, the right hand area R is 12 mm. wide, and the left hand area L is 8 mm. wide, then the overlapping area is 2 mm. in width in the center and 3-4 mm. at the bottom, and is of a peculiar shape as illustrated in Figure 40.

While the invention has been described above with reference to a typewriter for typing the Chinese language, it will be understood that the same structure, but with modified key symbols and type arrangements, may be used for printing other languages which are based upon the English alphabet and still other languages in which alphabets are not used. If desired, symbols, characters or alphabets for printing other languages can be applied to the keys and types inserted in the cylinder C for printing such symbols, inasmuch as the cylinder has sufficient blank spaces to receive such symbols.

Likewise, instead of providing the cylinder with printing types, it is possible to form inverse types or molds into which types can be cast. Also, the same principles may be followed in setting type, inasmuch as the cylinder may be used as a selecting and feeding mechanism for supplying types to a type frame. Moreover, the device may be simplified by reducing the number of type bars and corresponding keys, or by reducing the number of rows on a type bar and the number of types in a row and number of bottom symbol keys in proportion. Such a simplified device may be useful for some purposes, but will not permit the printing or selection of all of the words that can be printed or selected with the device described above. Therefore, the form of the invention described above should be considered as illustrative of the invention and not as limiting the scope of the following claims.

I claim:

1. A device for forming Oriental characters comprising movable means having elements thereon corresponding to Oriental characters and components of said characters, a first group of movable keys, each key having a symbol thereon like a different top configuration of a group of Oriental characters and components, a second group of movable keys, each key of said second group having a symbol thereon like a different bottom configuration of a group of said characters and components, a third group of movable keys, each key being movable to select one character or component of a group of characters and components having the same top and bottom configurations, a member movable relative to said movable means for supporting a receiving element for reproduction thereon of said components and characters, and means responsive to movement of one key of said first and second groups of keys and one key of the third group of keys for moving said movable means and said movable member to bring one of said elements having a top and a bottom configuration corresponding to the moved keys of said first and second groups and corresponding to the moved key of said third group into a predetermined relation to said movable member.

2. A device for forming Oriental characters comprising movable means having elements thereon corresponding to Oriental characters and components of said characters, a first group of movable keys, each key having a symbol thereon like a different top configuration of a group of Oriental characters and components, a second group of movable keys, each key of said second group having a symbol thereon like a different bottom configuration of a group of said characters and components, a third group of movable keys, each key being movable to select one character or component of a group of characters and components having the same top and bottom configurations, and means responsive to movement of one key of each of said first and third groups of keys for moving said movable means to bring to a predetermined position one of said elements having a component thereon corresponding to the moved keys of said first and said third group.

3. A device for selecting an element for forming desired Oriental characters from a large group of elements for forming Oriental characters, comprising first means for selecting a first group of elements for forming characters, each having a top configuration corresponding to the top configuration of said desired character, second means for selecting a second smaller group of elements for forming characters each having the same top and bottom configurations as said desired character and including said desired character, third means for selecting an element for forming said desired character from said second group, movable means for supporting a receiving element to have said character reproduced thereon and means responsive to all of said selecting means for moving said selected element to a predetermined position for forming said desired character and for moving said movable means to position said receiving element adjacent said selected element.

4. A device for selecting elements for forming characters and components thereof from a large group of elements for forming said characters and components, comprising a movable member having elements corresponding to said characters and components thereon, movable means for supporting a receiving element adapted to have said characters and components formed thereon, a keyboard having a first group of keys, each key having a symbol thereon like a different group of character and component elements on said member having the same top configuration, a second group of keys, each key of said second group having a symbol thereon like a different group of character and component elements on said member having the same bottom configuration, means responsive to actuation of a key of said first group for moving all of the characters and components having the same top configuration to predetermined positions, means responsive to actuation of a key of said second group for moving said movable means relatively to said movable member to position said movable means in predetermined relation to a group of character and component elements having the said top and bottom configurations, and means for selecting one of the last mentioned group of elements and forming it on the receiving element on said movable means.

5. A device for selecting elements for forming characters and components thereof from a large group of elements for forming such characters and components, comprising a movable member having forming elements corresponding to said characters and components, all of the character and component elements having the same top configuration being grouped together, a first group of keys, each key having a different symbol thereon like the top configuration of a different group of character and component elements having the same top configuration, means responsive to actuation of a key for moving said movable member to bring the corresponding group of elements to a predetermined position, means for displaying visually all of the components having the top configuration corresponding to the actuated key, another group of keys, and means responsive to actuation of each of said another group of keys for moving a selected component element of the group corresponding to a key of said first group to a position for forming said component.

6. A device for selecting elements for forming characters and components thereof from a large group of elements for forming such characters and components, comprising a movable member having forming elements corresponding to said characters and components, all of the character and component elements having the same top configuration being grouped together, a first group of keys, each key having a different symbol thereon like the top configuration of a different group of character and component elements having the same top configuration, means responsive to actuation of a key for moving said movable member to bring the corresponding group of elements to a predetermined position, another group of keys, means responsive to actuation of a key of said another group of keys for moving a different component element of the group corresponding to a key of said first group to a position for forming said component, an additional group of keys, each key having a symbol thereon like the bottom configuration of a group of character and component elements having the same bottom configuration, and means responsive to actuation of a key of each of the first and another groups of keys for moving a selected one of said elements to a predetermined position for forming the character or component thereon.

7. A typewriter comprising a rotatable printing cylinder having a plurality of type-carrying bars therein, said types being arranged to print characters and components of said characters, and said types being arranged in groups on said type-carrying bars, each group containing all the types having the same top configuration, and each group having types having top configurations different from the types in the other groups, said groups being further divided into sub-groups, each having different bottom configurations, a first group of keys, each having a symbol thereon like the top configuration of a different group of components and characters having the same top configuration, a second group of keys, each having a symbol thereon like the bottom configuration of a different group of characters and components having the same bottom configuration, a third group of keys, and means responsive to actuation of a key of the first group of keys and a key of the third group of keys for printing a selected component.

8. A typewriter comprising a rotatable printing cylinder having a plurality of type-carrying bars therein, said types being arranged to print characters and components of said characters, and said types being arranged in groups on said type-carrying bars, each group containing all the types having the same top configuration, and each group having types having top configurations different from the types in the other groups, said groups being further divided into sub-groups, each having different bottom configurations, a first group of keys each having a symbol thereon like a different top configuration, a second group of keys, each having a symbol thereon like a different bottom configuration, a third group of keys, means responsive to actuation of a key of the first group of keys and a key of the third group of keys for printing a selected component, and means responsive to actuation of keys of said first, third and second groups for printing a selected character or component.

9. A typewriter comprising a printing cylinder having a plurality of groups of type-carrying bars extending parallel with the axis thereof, said groups being rotatable relatively to said cylinder, and each bar in said groups being rotatable and having a plurality of rows of type extending longitudinally thereof, a paper carriage assembly movable parallel to said bars, a first group of keys, each key corresponding to one of said bars, means responsive to actuation of each key to move its corresponding bar adjacent to said paper carriage, a second group of keys each corresponding to the position of a different type in a row, means responsive to actuation of a key of said second group for moving said paper carriage assembly to position a selected portion of the carriage assembly adjacent to the type corresponding to said key, a third group of keys corresponding to the number of said rows of type on said bar, and means responsive to actuation of a key of said third group to rotate the type bar adjacent to said paper carriage assembly to place the corresponding row adjacent to said paper carriage assembly.

10. A typewriter comprising a rotatable printing cylinder having a plurality of type-carrying bars rotatably mounted thereon, each type bar having a plurality of rows of type extending longitudinally thereof, said rows being adapted to contain equal numbers of types occupying spaces along said bars, a first group of keys, each key corresponding to one of said type bars, a second group of keys, each of said second group of keys corresponding to a space along said bars, a third group of keys, each key of the third group corresponding to one of the rows on each type bar, a paper carriage movable parallel to the axes of said bars adjacent to said cylinder, means responsive to the keys of said first group for moving said cylinder to position a type bar corresponding to an actuated key adjacent to said paper carriage, means responsive to actuation of the keys of said second group for positioning a predetermined portion of said carriage adjacent to a type space corresponding to an actuated key, and means responsive to actuation of the keys of said third group to rotate a bar adjacent to said carriage to present a selected type to said paper carriage.

11. A typewriter comprising a rotary printing cylinder having a plurality of type bars thereon, each bar being rotatable relatively to said cylinder and having a plurality of longitudinally extending rows of types around its periphery, a keyboard having a key corresponding to each of said type bars, a key corresponding to each type in a row, and a key corresponding to each row of type on a type bar, a paper carriage, a printing hammer on said carriage, means supporting said carriage for movement parallel to said type bars, means for moving a sheet of paper perpendicular to said type bars and between said bars and said hammer, means responsive to actuation of a key corresponding to a bar for moving that bar adjacent to said carriage, means responsive to actuation of a key corresponding to the position of a type in said row for moving said carriage to place said hammer in alignment with the last mentioned type, and means responsive to actuation of a key corresponding to a row of type, for rotating the bar adjacent to said carriage to align a type in one of said rows with said hammer and actuating said hammer to force said paper against the last mentioned type.

12. A typewriter comprising a printing cylinder having a plurality of type bars thereon, each bar being rotatable relatively to said cylinder and having a plurality of longitudinally extending rows of types around its periphery, a paper carriage movable parallel to said bars, means normally maintaining said paper carriage centered with respect to said bars, a plurality of types corresponding to left hand components of Chinese characters substantially in the middle of said rows of types, a key corresponding to each of said bars, a key corresponding to each of said rows of types on a bar, a key corresponding to the position of each of the types in a row except said left hand component types, means responsive to actuation of a key corresponding to a bar for moving said bar adjacent to said paper carriage, means responsive to actuation of a key corresponding to a row for rotating said bar to move a left hand component type adjacent to said paper carriage, and means responsive to actuation of a key corresponding to the position of a type in a row for moving said carriage to position it with respect to the type corresponding to the actuated key.

13. A typewriter comprising a printing cylinder having a plurality of type bars thereon, each bar being rotatable relatively to said cylinder and having a plurality of longitudinally extending rows of types around its periphery, a paper carriage movable parallel to said bars, means normally maintaining said paper carriage centered with respect to said bars, a plurality of types corresponding to left hand components of Chinese characters substantially in the middle of said rows of types, a key corresponding to each of said bars, a key corresponding to each of said rows of types on a bar, a key corresponding to the position of each of the types in a row, except said left hand component types, means responsive to actuation of a key corresponding to a bar for moving said bar adjacent to said paper carriage, means responsive to actuation of a key corresponding to a row for rotating said bar to present a left hand component type to said paper carriage for printing, and means responsive to actuation of a key corresponding to the position of each type in a row for rendering ineffectual said means for maintaining said carriage centered and shifting said carriage to a position corresponding to the position in a row of the type corresponding to the actuated key.

14. A typewriter comprising a printing cylinder having a plurality of type bars thereon, each bar being rotatable relatively to said cylinder and having a plurality of longitudinally extending rows of types around its periphery, a paper carriage movable parallel to said bars, means normally maintaining said paper carriage centered with respect to said bars, a plurality of types corresponding to left hand components of Chinese characters substantially in the middle of said rows of types, a hammer mounted at about the center of said paper carriage, a key corresponding to each of said bars, a key corresponding to each of said rows of types on a bar, a key corresponding to the position of each of the types in a row, except said left hand component types, means responsive to actuation of a key corresponding to a bar for moving said bar adjacent to said paper carriage, means responsive to actuation of a key corresponding to the position of a type in a row for moving said carriage to position it with respect to the type corresponding to the actuated key, and means responsive to actuation of a key corresponding to a row for rotating said bar to present a left hand component type to said paper carriage for printing and for actuating said hammer.

15. A typewriter comprising a printing cylinder having a plurality of type bars thereon, each bar being rotatable relatively to said cylinder and having a plurality of longitudinally extending rows of types around its periphery, a paper carriage movable parallel to said bars, means normally maintaining said paper carriage centered with respect to said bars, spacing means for moving a sheet of paper step by step perpendicular to said bars, a plurality of types corresponding to left hand components of Chinese characters substantially in the middle of said rows of types, a key corresponding to each of said bars, a key corresponding to each of said rows of types on a bar, a key corresponding to the position of each of the types in a row except said left hand component types, means responsive to actuation of a key corresponding to a bar for moving said bar adjacent to said paper carriage, means responsive to actuation of a key corresponding to a row for rotating said bar to present a left hand component type to said paper carriage for printing, means for rendering said spacing means ineffective to move said paper upon printing a left hand component, and means responsive to actuation of a key corresponding to the position of a type in a row for moving said carriage to position it with respect to the type corresponding to the actuated key.

16. A typewriter comprising a printing cylinder having a plurality of type bars thereon, each bar being rotatable relatively to said cylinder and having a plurality of longitudinally extending rows of types around its periphery, a paper carriage movable parallel to said bars, means normally maintaining said paper carriage centered with respect to said bars, spacing means on said carriage for moving a sheet of paper step by step perpendicular to said bars, a plurality of types corresponding to left hand components of Chinese characters substantially in the middle of said rows of types, a key corresponding to each of said bars, a key corresponding to each of said rows of types on a bar, a key corresponding to the position of each of the types in a row except said left hand component types, means responsive to actuation of a key corresponding to a bar for moving said bar adjacent to said paper carriage, means responsive to actuation of a key corresponding to a row for rotating said bar to present a left hand component type to said paper carriage for printing, means responsive to actuation of a key corresponding to the position of a type in a row and a key corresponding to a row for actuating said spacing means to move said paper, means to render said spacing means ineffective to move said paper upon printing a left hand component, and means responsive to actuation of a key corresponding to the position of a type in a row for moving said carriage to position it with respect to the type corresponding to the actuated key.

17. In a typewriter, a rotatable printing cylinder having a plurality of groups of type bars, each group comprising a pair of spaced apart members rotatably supported on said cylinder and a plurality of type bars rotatably mounted between said members adjacent the peripheries thereof, a first drum fixed to one end of said cylinder and having angularly spaced stop surfaces thereon, a second drum at the opposite end of and rotatable relatively to said cylinder having other angularly spaced stop surfaces thereon, means for rotating said cylinder and said second drum, a key corresponding to each type bar, stop members adjacent to said first and second drums adapted to engage different stop surfaces on said drums, means connecting each of said keys to a pair of stop members, one member being adjacent to said first drum and the other stop member being adjacent to the second drum, and each key being connected to a different pair of stop members, said connecting means moving the stop members connected to a key into engagement with the drums upon actuation of said key, and gearing connecting said second drum to each of said groups whereby upon rotation of said cylinder and said second drum a type bar corresponding to an actuated key is moved to a predetermined position.

18. A cylinder for a character-forming device comprising a shaft, a pair of end plates fixed to said shaft in spaced apart relation axially of said shaft, a plurality of assemblies of character-forming bars mounted between said end plates adjacent the peripheries thereof for rotation relatively to said end plates, each assembly comprising a plurality of character-forming bars having a plurality of faces, end members supporting said bars for rotation, and means on said end members engaging said end plates rotatably.

19. A cylinder for a character-forming device comprising a shaft, a pair of end plates fixed to said shaft in spaced apart relation axially of said shaft, a plurality of assemblies of character-forming bars mounted between said end plates adjacent the peripheries thereof for rotation relatively to said end plates, each assembly comprising a plurality of character-forming bars having a plurality of faces, end members supporting said bars for rotation, means on said end members engaging said end plates, rotatably, a drum fixed to said shaft, and angularly related stop elements on said drum corresponding to the positions of said assemblies.

20. A cylinder for a character-forming device comprising a shaft, a pair of end plates fixed to said shaft in spaced apart relation axially of said shaft, a plurality of assemblies of character-forming bars mounted between said end plates adjacent the peripheries thereof for rotation relatively to said end plates, each assembly comprising a plurality of character-forming bars having a plurality of faces, end members supporting said bars for rotation, means on said end members engaging said end plates rotatably, a first drum fixed to said shaft, angularly related stop elements on said drum corresponding to the positions of said assemblies between said end plates, a second drum rotatably mounted on said shaft, gear means connecting said second drum to each of said assemblies, and stop means spaced angularly on said second drum and corresponding to the angular positions of the bars in said assemblies.

21. In a typewriter, the combination of a printing cylinder having a plurality of rows of types extending parallel to the axis of said cylinder, a paper carriage assembly adjacent to said cylinder, means supporting said carriage assembly for movement substantially parallel with the axis of said cylinder, means for moving said carriage assembly parallel with said cylinder in both directions, a plurality of keys, each key corresponding to the position of a type longitudinally of each row of types, a stop member corresponding to each key, means responsive to actuation of a key for moving a corresponding stop member into position to stop said carriage assembly adjacent to the type position corresponding to the actuated key, an additional stop member corresponding to the center of said rows of types, means normally maintaining said additional stop member in position to stop said carriage assembly in said center position, and means actuated by movement of any of the first mentioned stop members to carriage assembly stopping position for withdrawing said additional stop member out of carriage assembly stopping position.

22. In a carriage assembly for character-forming and selecting devices, the combination of a carriage, means supporting said carriage for transverse movement, a driven endless member adjacent to said carriage, means for driving said endless member in one direction, means on said carriage movable into a first position to engage said endless member to move the carriage in one direction, and movable to another position to engage said endless member to move said carriage in the opposite direction, a plurality of keys, stop members adjacent to said carriage movable into and out of the path of said movable means, and means connecting said keys to different stop members to move a stop member into the path of said movable means upon actuation of a corresponding key.

23. In a carriage assembly for character-forming and selecting devices, the combination of a carriage, means supporting said carriage for transverse movement, a driven endless member adjacent to said carriage, means for driving said endless member in one direction, means on said carriage movable into a first position to engage said endless member to move the carriage in one direction, and movable to another position to engage said endless member to move said carriage in the opposite direction, a plurality of keys, stop members adjacent to said carriage movable into and out of the path of said movable means, means connecting said keys to different stop members to move a stop member into the path of said movable means upon actuation of a corresponding key, means connected with one group of said keys for moving said movable means to said first position upon actuation of any key of said group, and means connected with another group of said keys for moving said movable means to said second position upon actuation of any of said another group of keys.

24. In a carriage assembly for character-forming and selecting devices, the combination of a carriage, means supporting said carriage for transverse movement, a driven endless member adjacent to said carriage, means for driving said endless member in one direction, means on said carriage movable into a first position to engage said endless member to move the carriage in one direction, and movable to another position to engage said endless member to move said carriage in the opposite direction, a plurality of keys, stop members adjacent to said carriage movable into and out of the path of said movable means, means connecting said keys to different stop members to move a stop member into the path of said movable means upon actuation of a corresponding key, an extra stop member corresponding to a centered position of said carriage, means for moving said extra stop member into position to stop said carriage, and means responsive to movement of said extra stop member to carriage stopping position to move said movable means to a position to move said carriage toward said extra stop member.

25. In a carriage assembly for character-forming and selecting devices, the combination of a carriage, means for supporting said carriage for transverse movement, a movable endless member having parallel flights, means for driving said endless member in one direction, shiftable means on said carriage for selectively connecting said carriage to one of said flights to move the carriage towards opposite ends of its transverse movement, and means rendered effective at opposite ends of said transverse movement for actuating said shiftable means to disconnect said carriage from one of said flights and connect said carriage to the other flight.

26. In a carriage assembly for typewriters, the combination of a paper carriage having a rotatable roll extending transversely thereof, a first supporting member, means supporting said carriage on said first member for movement substantially axially of said roll, a second supporting member, means supporting said first supporting member on said second supporting member for movement axially of said roll, a plurality of selecting keys, means controlled by said selecting keys for shifting said first supporting member in a direction axially of said roll from a centered position, a second group of printing keys, and escapement means controlled by said printing keys for rotating said roll to advance a sheet when said second supporting means is out of centered position.

27. In a carriage assembly for typewriters, the combination of a paper carriage having a rotatable roll extending transversely thereof, a first supporting member, means supporting said carriage on said first member for movement substantially axially of said roll, a second supporting member, means supporting said first supporting member on said second supporting member for movement axially of said roll, a plurality of selecting keys, means controlled by said selecting keys for shifting said first supporting member in a direction axially of said roll from a centered position, a second group of printing keys, escapement means controlled by said printing keys for rotating said roll to advance a sheet when said first supporting member is out of centered position, and means operative when said first supporting member is in centered position for preventing operation of said escapement means.

28. In a carriage assembly for typewriters, the combination of a paper carriage having a rotatable roll extending transversely thereof, a first supporting member, means supporting said carriage on said first member for movement substantially axially of said roll, a second supporting member, means supporting said first supporting member on said second supporting member for movement axially of said roll, a plurality of selecting keys, means controlled by said selecting keys for shifting said first supporting member in a direction axially of said roll from a centered position, a second group of printing keys, escapement means controlled by said printing keys for rotating said roll to advance a sheet when said first supporting member is out of centered position, and spacing means for moving said carriage relatively to said first supporting means axially of said roll.

29. In a typewriter, a carriage having at least two spaced apart parallel rolls over which a sheet of paper may be advanced, a printing hammer member mounted on said carriage and having an end projecting between said rolls for movement into contact with the back of said sheet, said hammer member comprising a pin having a rounded end, and a paper-contacting portion rockably supported on said rounded end.

30. In a typewriter, a carriage having at least two spaced apart parallel rolls over which a sheet of paper may be advanced, a printing hammer member mounted on said carriage and having an end projecting between said rolls for movement into contact with the back of said sheet, typewriter ribbon spools mounted at opposite ends of said carriage, means supporting said ribbon in front of and in spaced relation to said rolls, whereby the sheet passes between said ribbon and said hammer member, and means responsive to rotation of at least one of said rolls for rotating a spool to wind said ribbon thereon.

31. A character and character component-selecting device, comprising a plurality of first keys, each corresponding to a different group of characters and components containing the same symbol, a plurality of second keys, each corresponding to a group of characters and components containing the same symbol, means carrying character and component elements corresponding to the characters and components of said groups, means responsive to actuation of one of said first keys for moving the character and component elements of the group corresponding to the actuated key to a predetermined position, a member movable relatively to said character and component-carrying means, means responsive to actuation of one of said second keys for moving said member to bring a predetermined portion of said member adjacent to the elements having characters and components containing the symbols corresponding to the actuated second key, means responsive to actuation of said first and second keys for disclosing visibly the group of characters and components corresponding to the actuated keys, and means for selecting one element corresponding to the disclosed group of characters and components and moving it adjacent to said predetermined portion of the movable member.

32. A typewriter comprising a member having a plurality of types thereon, a carriage movable relatively to said member, means for moving a sheet substantially transversely with respect to the movement of said carriage, a printing hammer mounted on said carriage, a hammer bar extending substantially parallel with the path of movement of said carriage, a first group of keys, means responsive to said keys for moving said member to bring types corresponding to said keys adjacent to said carriage, a second group of keys, means responsive to said second group of keys for moving said carriage to align said printing hammer with one of a group of types, a third group of keys, and means responsive to said third group of keys for moving said member to align a selected type of the last mentioned group of types with said printing hammer and thereafter actuating said hammer bar to strike said printing hammer.

33. A typewriter comprising a rotatable cylinder member having a plurality of rows of types extending parallel to the axis of said cylinder member, a paper carriage, means supporting said carriage for movement parallel with the axis of said cylinder, means on said carriage for supporting a sheet for movement transversely of the direction of movement of said carriage, spacing means for moving said sheet supporting means step by step, power means for rotating said cylinder and moving said carriage, a first group of keys for controlling said power means to rotate said cylinder, a second group of keys for controlling said power means to move said carriage, a third group of keys for bringing a selected row of types adjacent to said carriage, and hammer means responsive to the said third group of keys for printing a type of said selected row on said sheet.

34. A typewriter comprising a rotatable cylinder member having a plurality of rows of types extending parallel to the axis of said cylinder member, a paper carriage, means supporting said carriage for movement parallel with the axis of said cylinder, means on said carriage for supporting a sheet for movement transversely of the direction of movement of said carriage, spacing means for moving said sheet supporting means step by step, power means for rotating said cylinder and moving said carriage, a first group of keys for controlling said power means to rotate said cylinder, a second group of keys for controlling said power means to move said carriage, a third group of keys for bringing a selected row of types adjacent to said carriage, hammer means responsive to the said third group of keys for printing a type of said selected row on said sheet, and means responsive to actuation of one key of each of the first, second and third groups of keys for actuating said spacing means.

35. A typewriter comprising a rotatable cylinder member having a plurality of rows of types extending parallel to the axis of said cylinder member, a paper carriage, means supporting said carriage for movement parallel with the axis of said cylinder, means on said carriage for supporting a sheet for movement transversely of the direction of movement of said carriage, spacing means for moving said sheet supporting means step by step, power means for rotating said cylinder and moving said carriage, a first group of keys for controlling said power means to rotate said cylinder, a second group of keys for controlling said power means to move said carriage, a third group of keys for bringing a selected row of types adjacent to said carriage, hammer means responsive to the said third group of keys for printing a type of said selected row on said sheet, and means responsive to actuation of one key of each of said first and third groups of keys for rendering said spacing means ineffective to move said sheet.

36. A device for forming Oriental characters comprising movable means having elements thereon corresponding to Oriental characters and components of said characters, a first group of movable keys, each key having a symbol thereon like a different top configuration of a group of Oriental characters and components, a second group of movable keys, each key of said second group having a symbol thereon like a different bottom configuration of a group of said characters and components, a third group of movable keys, each key being movable to select one character or component of a group of characters and components having the same top and bottom configurations, and means responsive to actuation of one key of said first group of keys and one key of said third group of keys for reproducing a selected component on a receiving element.

37. A keyboard controlled device for reproducing Oriental characters and components thereof, comprising a first group of keys, each having a different symbol thereon like the top configuration of a group of Oriental characters and components having the same top configuration, a second group of keys, each key having a different symbol thereon like the bottom configuration of a group of Oriental characters and components having the same bottom configuration, a visual indicator, means in said indicator responsive to actuation of a key of said first group for displaying a group of components having the same top configuration as the symbol on the actuated key, means in said indicator responsive to actuation of one key of each of said first and second groups of keys for displaying characters and components having the same top and bottom configurations as the symbols on the actuated keys, a third group of keys corresponding to the positions of the displayed characters and components, and means responsive to actuation of a key of said third group for reproducing the character or component corresponding to said actuated key of said third group.

38. A device for selecting and manifesting the characters and components of a written Oriental language, comprising first means for selecting a first group of characters and components, each character and component of the group containing a first symbol like a symbol present in the desired character or component, second means for selecting from said first group a second smaller group of characters and components each containing said first symbol and another symbol also present in the desired character, third means for selecting the desired character from said smaller group and means responsive to the third means for manifesting the selected character.

39. A keyboard controlled device for manifesting characters and components of a written Oriental language, comprising a first group of keys, each key corresponding to a different group of characters and components of the Oriental language, each group having a first common characteristic different from the characteristics of the other groups, a second group of keys, each key of the second group corresponding to a different subgroup of characters and components, each of these subgroups having a second common characteristic different from the other subgroups, a visual indicator responsive to actuation of a key of the first group for displaying a group of components having a corresponding first characteristic, said indicator further being responsive to actuation of one key of each of the first and second groups of keys for displaying a subgroup of characters and components having first and second characteristics corresponding to the actuated keys, a third group of keys corresponding to the positions of the displayed group of characters and components, and means responsive to actuation of a key of said third group for manifesting the character or component corresponding to the actuated key of said third group.

40. A device for selecting and manifesting characters and components of a written Oriental language, comprising a first group of keys corresponding to a plurality of different groups of characters and components of a written Oriental language, each key corresponding to a group of characters and components containing a first symbol common to all members of the group, all of the groups having different first symbols, a second group of keys corresponding to different subgroups of the first-mentioned groups, each of said second group of keys corresponding to characters and components containing a second symbol common to all members of the subgroup, all of the subgroups having different second symbols, means responsive to actuation of keys of said first and second groups of keys for selecting a subgroup of characters and components containing the same first and second symbols, a third group of keys for selecting from the last-mentioned subgroup a desired character or component and means responsive to said third group of keys for manifesting the selected character or component.

41. A device for selecting an element from a group of elements corresponding to characters and components of a written Oriental language, comprising a movable member having groups of forming elements corresponding to said characters and components, all of the character and component elements including a common symbol being grouped together, a first group of keys, each key corresponding to at least one of said groups of character and component elements, means responsive to actuation of a key for moving said movable member to bring the corresponding group of elements to a predetermined position, means for displaying visually all of the characters and components containing the symbol corresponding to the actuated key, another group of keys, and means responsive to actuation of each of said another group of keys for moving a selected element corresponding to a character or component of the displayed group to a predetermined position and manifesting said element.

42. A character and character component selecting device, comprising a plurality of first keys, each corresponding to a different group of characters and components containing the same first symbol, a plurality of second keys, each corresponding to a group of characters and components containing the same second symbol, means carrying elements corresponding to said characters and components, means responsive to actuation of said first and second keys for disclosing visually a group of characters and components containing the first and second symbols corresponding to the actuated keys, means for selecting one of the characters and components of the disclosed group and means responsive to said selecting means for moving the corresponding element to a predetermined position and manifesting it.

43. A character reproducing machine including, in combination, a series of character bearing bars, each rotatable about its own axis and having a plurality of corresponding axial rows of characters, said bars being arranged in a plurality of concentric groups and disposed concentrically within each group, rotatable auxiliary supports, one for each group of bars, and a main rotatable support for the auxiliary supports.

44. A keyboard controlled typewriter adapted to type hundreds of signs comprising three groups of keys, a rotatable typewheel and a number of rotatable type cylinders supported by said typewheel, said cylinders having longitudinal and circumferential rows of types to register both ways, said typewheel adapted to present by rotation selectively any of said type cylinders opposite a line of printing locations, means linked to each of a first group of keys to move and stop said typewheel, a hammer extending along said typewheel for the length of said line of printing locations, a carriage and means supported by said carriage to transmit the blow of said hammer, a paper carrier movable along said line, means linked to each of a second group of keys adapted upon depression of any of said second group of keys to register said blow transmitting means selectively with any of said circumferential rows of type, means linked to each of a third group of keys adapted upon depression of one of said third group of keys to turn the selected type cylinder selectively to present any one of the longitudinal rows of type to said line of printing locations, means to activate the hammer, and means to release said hammer-activating means, said releasing means being linked to and activated by each of said third group of keys.

45. In a typewriter adapted to type hundreds of signs, a number of type cylinders which have types in registering longitudinal and circumferential rows, three groups of keys, printing means, means linked to each of a first group of keys adapted upon depression of one key of said group to present selectively one of said type cylinders to said printing means, means actuated by each of a second group of keys, arranged to align selectively said printing means with a circumferential row of types, means linked to each of a third group of keys actuated upon depression of one of said group to turn selectively the selected type cylinder to present any one type in said circumferential row to said printing means, information bearing members having reproductions of the types on the type cylinders, viewing means, means to move said information bearing members upon depression of one of said first group of keys to present reproductions of the types on said selected type cylinder to said viewing means, said viewing means arranged to restrict the reproductions visible to the operator, to those corresponding to one circumferential row of types on one type cylinder, and means to transmit relative motion between said printing means and said type cylinder arranged to reproduce a corresponding relative motion between said viewing means and said information bearing members, so that the reproductions visible to the operator correspond to the types on the type cylinder selected by depression of one of said first group of keys, in the circumferential row selected by depression of one of said second group of keys.

46. A character and character component-selecting device, comprising a plurality of first keys, each having a symbol thereon corresponding to a different group of characters and components containing the same symbol, a plurality of second keys, each corresponding to a different group of characters and components containing the same symbol, means carrying character and component elements corresponding to the characters and components of said groups, means responsive to actuation of one of said first keys for moving the character and component-carrying elements of the group corresponding to the actuated key to a predetermined position, a member having an opening therein for exposing a group of said elements to view, and means responsive to actuation of one of said second keys for moving said member and said element carrying means relatively to bring said opening in alignment with a group of elements having characters and components containing the symbols corresponding to the actuated second key.

47. A keyboard controlled device for selecting written Oriental characters and components thereof, comprising a first group of keys, each having a different symbol thereon like the top configuration of a group of Oriental characters and components having the same top configuration, a second group of keys, each key having a different symbol thereon like the bottom configuration of a group of Oriental characters and components having the same bottom configuration, a visual indicator, means in said indicator responsive to actuation of a key of said first group for displaying a group of components having the same top configuration as the symbol on the actuated key, means in said indicator responsive to actuation of one key of each of said first and second groups of keys for displaying characters and components having the same top and bottom configurations as the symbols on the actuated keys, a third group of keys corresponding to the positions of the displayed characters and components, and means responsive to actuation of a key of said third group for selecting the character or component corresponding to said actuated key of said third group.

48. A keyboard controlled device for selecting characters and components of a written Oriental language, comprising a first group of keys, each key corresponding to a different group of characters and components of the Oriental language, each group having a first common characteristic different from the characteristics of the other groups, a second group of keys, each key of the second group corresponding to a different subgroup of characters and components, each of these subgroups having a second common characteristic different from the other subgroups, a visual indicator responsive to actuation of a key of the first group for displaying a group of components having a corresponding first characteristic, said indicator further being responsive to actuation of one key of each of the first and second groups of keys for displaying a subgroup of characters and components having first and second characteristics corresponding to the actuated keys, and a third group of keys corresponding to the positions of the displayed group of characters and components for selecting a character or component corresponding to any of the displayed group.

49. A device for selecting an element from a group of elements corresponding to characters and components of a written Oriental language, comprising a movable member having elements corresponding to said characters and components, all of the character and component elements including a common symbol being grouped together, a first group of keys, each key corresponding to at least one of said groups of character and component elements, means responsive to actuation of a key for moving said movable member to bring the corresponding group of elements to a predetermined position, means for displaying visually all of the components containing the symbol corresponding to the actuated key, another group of keys, and means responsive to actuation of each of said another group of keys for moving a selected component element of the displayed group to a predetermined position.

50. A character and character component-selecting device, comprising a plurality of first keys, each corresponding to a different group of characters and components containing the same first symbol, a plurality of second keys, each corresponding to a group of characters and components containing the same second symbol, means carrying elements corresponding to said characters and components, means responsive to actuation of said first and second keys for disclosing visually a group of characters and components containing the first and second symbols corresponding to the actuated keys, and means for selecting one of the characters and components of the disclosed group and means responsive to said selecting means for moving the corresponding element to a predetermined position.

51. In a typewriter adapted to type hundreds of signs, a rotatable wheel disposed horizontally in front of an operator, a plurality of rotatable type supporting cylinders carried by said wheel, means constructed and arranged for printing adjacent a plane of vision from the eyes of the operator tangent to the apparently uppermost type-supporting cylinder, means to support a sheet on which an impression is to be made, to pass between said printing means and said apparently uppermost type cylinder, said printing means being to the rear of the sheet, and means to deflect the sheet immediately above said printing means in a direction up and away from said cylinder, to render the impression visible to the operator upon a small upward movement of the sheet, which upward movement may be the spacing after printing.

52. A keyboard controlled typewriter adapted to type hundreds of different signs, comprising a rotatable typewheel supporting a plurality of typefaces, arranged in longitudinal and circumferential rows, rotatable selectively to a line of printing locations, a hammer extending along said typewheel for the length of said line, means to activate the hammer, a movable carriage which supports a sheet to receive an impression, means to transmit the blow of said hammer selectively to any of said printing locations in said line, said blow-transmitting means being supported by said carriage, the movement of said carriage being controlled by the keyboard, means supported by the carriage for spacing the impressions on said sheet, and means carried by the hammer to engage and activate said spacing means.

53. A keyboard controlled typewriter adapted to type hundreds of signs comprising a rotatable typewheel carrying a plurality of type cylinders, means for printing, said typewheel adapted to present selectively any one of said type cylinders to a position adjacent said means for printing, said type cylinders each having a number of longitudinal rows of type faces in the same angular relation on their circumferences, means to present said type cylinder to said position, said means also serving to present the same corresponding initial row of type faces on each type cylinder in an initial position to face said means for printing, and a group of keys on the keyboard, each key of said group commanding one corresponding row of typefaces on all cylinders, a member adapted to engage and rotate the presented type cylinder selectively to any one of said angular positions each presenting to the printing means another of said rows, means to actuate said printing means while said selected row is in printing position, said engaging and rotating means adapted to rotate said type cylinder back to said initial position after printing and to disengage said cylinder, said means including a number of motion transmitting members arranged to be driven by motive power and each member adapted to transmit a different amount of motion, and locking means adapted to lock said type cylinder in its said initial position.

54. A keyboard controlled typewriter adapted to type hundreds of signs comprising three groups of keys, a rotatable typewheel and a number of rotatable type cylinders supported by said typewheel, said cylinders having longitudinal and circumferential rows of types to register both ways, said typewheel adapted to present by rotation selectively any of said type cylinders opposite a line of printing locations, means linked to each of a first group of keys to move and stop said typewheel, a hammer extending along said typewheel for the length of said line of printing locations, a carriage and means supported by said carriage to transmit the blow of said hammer, a paper carrier movable along said line, means linked to each of a second group of keys adapted upon depression of any of said second group of keys to register said blow transmitting means selectively with any of said circumferential rows of type, means linked to each of a third group of keys adapted upon depression of one of said third group of keys to turn the selected type cylinder selectively to present any one of the longitudinal rows of type to said line of printing locations, means to activate the hammer, means to release said hammer-activating means, said releasing means being linked to and activated by each of said third group of keys, a differential, means to drive said differential, said differential having a drive gear and two driven gears meshing with said drive gear, a slip motion clutch, means to transmit rotary motion from one of said driven gears to said clutch, motion transmitting means to drive said typewheel, and motion transmitting means to drive said carriage, one of said motion transmitting means arranged to be driven by said clutch, the other motion transmitting means arranged to be driven by said second driven gear.

55. A keyboard controlled typewriter adapted to type hundreds of signs comprising means for printing, a typewheel, a first stop drum connected to said typewheel, a number of satellite shafts with a satellite gear fixed to each said shaft, supported by said typewheel, a number of rotatable type cylinders each having rows of types on its circumference rotatably supported by said satellite shafts, a second rotatable stop drum having a sun gear connected thereto and in meshing engagement with each of said satellite gears, means to drive the stop drums, stops carried by both stop drums on their circumference, stop members insertable in the paths of selected stops, said stops on both stop drums being disposed in such angular relation that upon insertion of one stop member for each stop drum the typewheel and the satellite shafts will, when stopped, present one of said type cylinders into a position facing said means for printing, and means for rotating said presented type cylinder selectively to a number of angular positions to present a selected row of type faces to said means for printing.

56. A keyboard controlled typewriter adapted to type hundreds of signs comprising in combination means for printing, a typewheel, a stop drum attached thereto, a number of rotatable satellites carried by the typewheel, each satellite supporting a number of rotatable type cylinders each of which has longitudinal rows of types arranged on its circumference, a gear carried by each satellite, a sun gear coaxial with said typewheel and in meshing engagement with the satellite gears, a stop drum connected to the sun gear, both stop drums having stops, stop members selectively insertable in the paths of any of said stops, said stops on both said stop drums being placed in such angular relation that upon insertion of one stop member for each stop drum the typewheel and one satellite will cooperate to bring one of said type cylinders in a position to face said means for printing, a number of motion transmitting members adapted to interpose said stop members into said paths of said stops, one motion transmitting member for interposing each typewheel stop member and one for each satellite stop member, a group of keys on the keyboard, each key of said group adapted to command one type cylinder, and links to transmit motion from each key to one of said motion transmitting members acting on said type wheel stop drum, and to one motion transmitting member acting on the satellite stop drum.

57. A keyboard controlled typewriter adapted to type hundreds of signs comprising in combination, means for printing, a group of keys, a rotatable typewheel, a stop drum connected to said typewheel, satellites rotatably supported by said typewheel, type cylinders rotatably supported by said satellites, a rotatable satellite stop drum, means for driving both stop drums, means for gearing said satellites to said satellite stop drum, stops on the typewheel stop drum in equal angular relation to the satellites, stops on the satellite stop drum in equal angular relation to the type cylinders on the satellites, considering the ratio of said means for gearing, said type cylinders having types in registering circumferential and longitudinal rows and constructed and arranged to be presented selectively to said means for printing, motion transmitting members linked to the keys of said group, stop members selectively insertable in the paths of said stops on both stop drums by action of said motion transmitting members, and bails actuated by the movement of any key in said group to remove any stop members from the paths of stops on both stop drums, freeing both stop drums to rotate, two motion transmitting members being linked to each key of said group, each to insert selectively one stop member in the path of one stop of the typewheel stop drum and one stop member in the path of one stop of the satellite stop drum so that upon completion of the movement of each stop drum the type cylinder selected by depression of one key of said group is presented to said means for printing.

58. In a typewriter adapted to type hundreds of signs and having a number of type cylinders which have types in longitudinal and circumferential rows, three groups of keys, means for printing, means linked to a first group of keys adapted to present selectively one of said type cylinders to said means for printing, means actuated by depression of each of a second group of keys arranged to align said means for printing selectively with a circumferential row of types, information-bearing members having reproductions of the types on the type cylinders, restricting means, restricting the information visible to the operator to those types selectable by depression of one of a third group of keys, means adapted to transmit motion of the type cylinders to said information-bearing members, and means to transmit relative motion between said means for printing and said type cylinders to create relative motion between said restricting means and said information-bearing members, so that the reproductions visible to the operator correspond to the types on the selected type cylinder in the selected circumferential row.

59. A combination as in claim 58, in which the reproductions of types supported by the information-bearing members are reduced in size relative to the size of types, and arranged in groups instead of rows, and including optical means to re-enlarge the reproductions to make them clearly visible to the operator.

60. A keyboard controlled typewriter adapted to type hundreds of signs and to produce combinations by typing in which some of the types are complete characters and other of the types are portions of characters, two of the latter types being arranged to be combined by successive typing to print complete characters, said typewriter having type cylinders each of which has types arranged in longitudinal and circumferential rows, a printing member having a printing face, arranged to be pressed against a type face on said type cylinder, a carriage to support a sheet between said printing member and said type cylinder to receive impressions, a blow transmitting member to press the face of said printing member against said type face, and spring means to remove said printing member from the immediate vicinity of said type cylinder after printing, said printing member being designed and arranged to pivot on said blow-transmitting means, said pivoting axis being in the immediate vicinity of said printing member face and substantially parallel to the axis of said type cylinder to allow the latter face to conform to the type face and overcome imprecision in alignment but to produce a clear impression of a type face occupying only a portion of the surface of the printing face offset to one side.

61. A keyboard controlled typewriter adapted to type hundreds of signs comprising a rotatable type supporting-wheel, means for printing, means to produce relative motion between said means for printing and said type wheel, means to support a sheet to receive impressions between said means for printing and said type wheel, said sheet-supporting means comprising a clamp, means to index said clamp in a direction away from said printing means, a pair of clamping rollers arranged to clamp a portion of the sheet so that the printed portion is between said clamp and said clamping rollers, spring means to clamp the sheet between said clamping rollers, by pressing said rollers together, friction producing means arranged to brake said clamping rollers when said clamp is indexed away from said clamping rollers to produce tension in the sheet, and allow both rollers to rotate and release the same length of sheet on both sides regardless of the printing occurring in the center or side of said sheet, and rotating spring means to turn said friction producing means on at least one clamping roller in the direction to pull the sheet back between said clamping rollers, said rotating spring means arranged to be reloaded by said index movement and to restore tension in the sheet after a printing operation not followed by indexing as required when the typing of a first component part of a character is to be followed by the typing of a second component part to form a complete character.

62. In a keyboard controlled typewriter, a plurality of keys, means for printing, a rotatable typewheel, a plurality of satellites supported by said typewheel, type cylinders rotatably supported by said satellites and having types in longitudinal and circumferential rows, a satellite stop drum coaxial with and rotatable independently of said typewheel, a stop drum fastened to said typewheel, stops on both stop drums, shiftable stop members insertable in the paths of said stops, means to insert said shiftable stop members in said paths upon depression of corresponding keys, satellite gears on said satellites, and a sun gear on said satellite stop drum meshing with said satellite gears, the relation between said gears being such that one complete revolution of the sun gear corresponds to a plurality of complete revolutions of said satellite gears so that each shiftable stop member inserted in the path of a stop on the satellite stop drum places one type cylinder of each satellite in a position facing said means for printing, regardless of the number of complete revolutions made by the satellite stop drum.

63. A typewriter as in claim 62, including a differential drive arranged preferably coaxially with the typewheel and means to drive said differential, said differential having two driven gears, one of which drives the typewheel, the other of which drives said satellite stop drum so that whenever rotation of one of the two stop drums is arrested, the whole available power is utilized to accelerate the rotation of the other stop drum.

64. In a keyboard controlled typewriter adapted to type hundreds of signs, a first group of keys, a rotatable typewheel supporting types in circumferential rows, means for printing, a carriage supporting said means for printing to move it along the length of said typewheel to register it with any of said circumferential rows, each key of said group commanding a different row, a number of shiftable spring retracted stop members, one corresponding to each key, means linked to each key to shift said stop members from the retracted position to a projected stopping position, means to lock said stop members in said projected position, said lock means arranged to unlock any previously locked member for retraction by its spring when a new stop member is projected, a shiftable member moving with said carriage, means to retain said shiftable member in one of two positions, conveying means engaged by said shiftable member when in one position, to move the carriage to the right, and conveying means engaged by said shiftable member in the other of its positions to move said carriage to the left, said shiftable member having a portion engageable by a projected stop upon movement of said carriage to the right, and another portion engageable by a projected stop when said carriage is moving to the left, both said portions arranged to register said printing means with said row of types corresponding to said stop, upon contacting said stop member in projected position.

65. A typewriter as in claim 64, comprising an additional spring retracted stop member corresponding to a circumferential row of types near the center of said typewheel and to a rest position of said carriage, a first motion transmitting member movable upon depression of any said key which commands a position to the right of said rest position, a second motion transmitting member movable upon depression of any said key which commands a position to the left of said rest position, said motion transmitting members being linked to said shiftable member to place it in the positions to move said carriage selectively to the right or left, means to activate said printing means including a spring retracted element, motion transmitting means linked to said additional stop member in the rest position of said carriage arranged to shift said stop member to said projected position when actuated by said spring retracted element, a third motion transmitting member actuated by said spring retracted element, and alternatively engageable means linking said third motion transmitting member to said shiftable member, causing it to shift its position, so that after printing the carriage will reverse its direction to return to its rest position.

66. A combination as in claim 64, including end return mechanism, and end shifting means in reciprocal engagement with said shiftable member, located to be engaged upon the carriage overtravelling either of its two extreme positions, said end shifting means having springs and restraining members, the latter arranged to prevent premature shifting of said shiftable member and allowing an amount of overtravel to load said springs, said end shifting means being arranged to apply the stored energy of said springs to shift said shiftable member to its other position when it has passed said restraining members, whereby said shifting of the shiftable member to its other position causes the carriage to reverse the direction of its movement.

67. In a keyboard controlled typewriter of the kind adapted to type hundreds of characters and to combine characters from first and second component parts; a rotatable type supporting wheel having types in circumferential rows, one of said rows containing only types of first component parts, the other rows containing types of second component parts and complete characters, a group of keys, printing means, a carrier to support said printing means, means to move said carrier to align said printing means selectively with any one of said circumferential rows, said moving means actuable by depression of any of said group of keys, a paper carrier to support a sheet between said printing means and said typewheel, to receive impressions, a swinging hammer extending the length of said typewheel to actuate said printing means on its forward stroke, and means to index said sheet on said paper carrier to space the impressions, said means comprising one motion transmitting member extending along said paper carrier, engageable means linked to said motion transmitting member and movable with said printing means relative to said typewheel, and a second motion transmitting member extending along and supported by said hammer, said second motion transmitting member arranged to engage said engageable means on said return movement of the hammer after printing, when the printing means are in line with rows of types having complete characters and second component parts to cause spacing movement to be transmitted to said paper carrier, and arranged to refrain from transmitting indexing motion when the printing means are aligned with said row of first component parts to omit indexing after first component parts are printed to allow second component parts immediately thereafter printed to register on the sheet with first component parts.

68. In a typewriter adapted to type hundreds of signs, a group of keys, a typewheel supporting type cylinders having types in registering circumferential rows, printing means, a printing carriage to support said printing means movable parallel to the axes of said type cylinders for the length of said typewheel, means linked to and actuated by one of the keys in said group to move said printing carriage to align selectively said printing means with each of said rows of types, a paper carrier movable in a direction parallel to the movement of said printing carriage, arranged to support a sheet to receive impressions between said typewheel and said printing means, means to lock said paper carrier to said printing carriage to cause the paper carrier to follow the movement of said printing carriage, means to index said paper carrier relative to said printing carriage, and means supported by said paper carrier, movable by an operator to actuate said indexing means to space the impressions on said sheet.

LIN YUTANG.

REFERENCES CITED

The following references are of record in the file of this patent:

UNITED STATES PATENTS

| Number | Name | Date |
| --- | --- | --- |
| 637,109 | Haddad | Nov. 14, 1899 |
| 638,131 | Marshman | Nov. 28, 1899 |
| 714,621 | Tcherkassov et al. | Nov. 25, 1902 |
| 966,715 | Stallman | Aug. 9, 1910 |
| 1,024,211 | Leonard et al. | Apr. 23, 1912 |
| 1,130,332 | Pittenger | Mar. 2, 1915 |
| 1,247,585 | Shah | Nov. 20, 1917 |
| 1,260,753 | Chi | Mar. 26, 1918 |
| 1,443,108 | Walton | Jan. 23, 1923 |
| 2,091,555 | Messinger | Aug. 31, 1937 |
| 2,105,731 | Graves et al. | Jan. 18, 1938 |
| 2,412,777 | Kao | Dec. 17, 1946 |